US012725482B1

(12) United States Patent
Crandall et al.

(10) Patent No.: US 12,725,482 B1
(45) Date of Patent: Sep. 1, 2026

(54) SYSTEMS AND METHODS FOR PROVIDING EXPANDED CASH MANAGEMENT FUNCTIONALITY VIA A POINT-OF-SALE TERMINAL

(71) Applicant: G4S Retail Solutions (USA) Inc., Jupiter, FL (US)

(72) Inventors: Shellie Crandall, Palm Beach Gardens, FL (US); Brian McCabe, Jupiter, FL (US)

(73) Assignee: G4S Retail Solutions (USA) Inc., Jupiter, FL (US)

(*) Notice: Subject to any disclaimer, the term of this patent is extended or adjusted under 35 U.S.C. 154(b) by 123 days.

(21) Appl. No.: 17/166,561

(22) Filed: Feb. 3, 2021

Related U.S. Application Data

(60) Provisional application No. 62/972,947, filed on Feb. 11, 2020.

(51) Int. Cl.
*G07F 9/02* (2006.01)
*G06Q 20/20* (2012.01)

(52) U.S. Cl.
CPC ............. *G07F 9/026* (2013.01); *G06Q 20/20* (2013.01); *G07F 9/023* (2013.01)

(58) Field of Classification Search
CPC ....... G07F 9/026; G06Q 20/20; G06Q 20/202
See application file for complete search history.

(56) References Cited

U.S. PATENT DOCUMENTS

| | | | |
|---|---|---|---|
| 5,553,320 | A | 9/1996 | Matsuura et al. |
| 7,610,215 | B1 | 10/2009 | Folk et al. |
| 7,635,085 | B2 | 12/2009 | Brown et al. |
| 7,900,829 | B1 | 3/2011 | Folk et al. |
| 7,940,176 | B2 | 5/2011 | Bohen et al. |
| 7,950,512 | B2 | 5/2011 | Folk et al. |
| 7,954,699 | B1 | 6/2011 | Sanders et al. |
| 8,011,581 | B1 | 9/2011 | Folk et al. |
| 8,019,663 | B1 | 9/2011 | Bohen et al. |

(Continued)

OTHER PUBLICATIONS

Hoffmann Nicolas, Loyalty Schemes in Retailing: A Comparison of Stand-alone and Multi-partner Programs, 2013, Peter Lang International Academic Publishers, 1st Edition (Year: 2013).*

(Continued)

*Primary Examiner* — E Carvalho
(74) *Attorney, Agent, or Firm* — Alston & Bird LLP

(57) ABSTRACT

Methods and systems are provided for automatically reallocating physical cash among a plurality of point-of-sale (POS) terminals. Cash usage forecast data is stored for a plurality of POS terminals (including at least one self-checkout (SCO) terminal capable of operating in a primary mode and a cash management mode). Cash usage is monitored at each of the POS terminals, and upon determining that the cash usage of a second POS terminal does not satisfy cash usage forecast data stored for the second POS terminal, reallocation data is generated for moving cash from the SCO POS terminal to the second POS terminal. The reallocation data comprises executable reallocation instructions that identify a denomination-specific cash quantity to be transferred and identifies the second POS terminal as the destination for transfer; and notification data for transmission to a user authorized to move physical cash between POS terminals.

19 Claims, 9 Drawing Sheets

(56) References Cited

U.S. PATENT DOCUMENTS 8,025,214 B1 9/2011 Folk et al.
8,032,415 B2 10/2011 Sanders et al.
8,047,427 B2 11/2011 Sanders et al.
8,056,305 B1 11/2011 Folk et al.
8,096,398 B2 1/2012 Folk et al.
8,117,127 B1 2/2012 Sanders et al.
8,141,772 B1 3/2012 Folk et al.
8,157,078 B1 4/2012 Folk et al.
8,172,067 B1 5/2012 Folk et al.
8,175,970 B1 5/2012 Mon et al.
8,177,132 B1 5/2012 Bohen et al.
8,181,854 B1 5/2012 Folk et al.
8,181,856 B1 5/2012 Folk et al.
8,196,826 B2 6/2012 Folk et al.
8,201,680 B1 6/2012 Folk et al.
8,210,429 B1 7/2012 Bohen et al.
8,214,257 B1 7/2012 Folk et al.
8,225,988 B1 7/2012 Bohen et al.
8,227,936 B1 7/2012 Folk et al.
8,260,669 B1 9/2012 Folk et al.
8,272,563 B1 9/2012 Folk et al.
8,274,364 B1 9/2012 Bohen et al.
8,327,995 B1 12/2012 Folk et al.
8,346,640 B1 1/2013 Sanders et al.
8,387,874 B1 3/2013 Bohen et al.
8,396,278 B2 3/2013 Jones et al.
8,401,965 B2 3/2013 Johnson et al.
8,407,119 B2 3/2013 Folk et al.
8,430,303 B1 4/2013 Sanders et al.
8,517,257 B1 8/2013 Folk et al.
8,556,166 B1 10/2013 Folk et al.
8,561,885 B1 10/2013 Folk et al.
8,571,948 B1 10/2013 Nichols et al.
8,600,842 B1 12/2013 Sanders et al.
8,601,771 B2 12/2013 Folk et al.
8,602,295 B1 12/2013 Sanders et al.
8,640,945 B1 * 2/2014 McCormick ........... G07D 11/34 235/379
8,781,903 B1 7/2014 Bohen et al.
8,812,366 B2 8/2014 Folk et al.
8,812,394 B1 8/2014 Folk et al.
8,909,547 B2 12/2014 Bohen et al.
8,925,797 B1 1/2015 Bohen et al.
9,004,352 B1 4/2015 Graef et al.
9,064,366 B1 6/2015 Folk et al.
9,070,125 B1 6/2015 Folk et al.
9,098,960 B1 8/2015 Folk et al.
9,311,671 B2 4/2016 Folk et al.
9,547,848 B2 1/2017 Folk et al.
9,697,493 B2 7/2017 Folk et al.
9,715,793 B1 7/2017 Brancaccio
11,188,910 B2 11/2021 Yang
11,315,379 B1 4/2022 Crandall et al.
11,410,149 B1 * 8/2022 Goetz .................... G06Q 20/32
11,688,221 B1 6/2023 Crandall
12,002,319 B1 6/2024 McCabe
2002/0074709 A1 6/2002 Kanagawa
2005/0011721 A1 1/2005 Armanini et al.
2005/0027626 A1 2/2005 Garcia
2005/0289030 A1 12/2005 Smith
2006/0253349 A1 11/2006 Brooks, Jr. et al.
2009/0070263 A1 3/2009 Davis et al.
2010/0010904 A1 1/2010 Sanders
2011/0060639 A1 3/2011 Garcia
2011/0258090 A1 10/2011 Bosch et al.
2012/0073482 A1 3/2012 Meeker et al.
2013/0191196 A1 7/2013 Cecala
2013/0232064 A1 9/2013 Bosch
2013/0346135 A1 12/2013 Siemens et al.
2014/0279675 A1 9/2014 Wiig et al.
2014/0353375 A1 12/2014 Turocy et al.
2017/0061561 A1 3/2017 Cha
2017/0193731 A1 7/2017 Kim et al.
2017/0232300 A1 8/2017 Tran et al.
2018/0005193 A1 1/2018 Crandall et al.
2018/0005196 A1 1/2018 Crandall et al.
2018/0047239 A1 * 2/2018 Niizuma ................... G07F 9/10
2018/0078843 A1 3/2018 Tran et al.
2018/0144321 A1 * 5/2018 Baar .................... G06Q 20/382
2018/0218323 A1 8/2018 Nguyen
2018/0240190 A1 8/2018 Schumacher
2018/0293649 A1 10/2018 Morgan et al.
2018/0300703 A1 10/2018 Hiramatsu et al.
2018/0336766 A1 * 11/2018 Cantley ................ G06Q 10/087
2019/0163769 A1 * 5/2019 Hachem ................. G06Q 20/18
2019/0220839 A1 7/2019 Oliynyk
2021/0327198 A1 * 10/2021 Yukawa ................. G07D 11/20
2022/0122429 A1 * 4/2022 Ciprian Petru ..... G06F 18/2431
2022/0414632 A1 * 12/2022 O'Herlihy ............ G07G 1/0063
2023/0043615 A1 * 2/2023 Saitoh .................... G07G 1/009

OTHER PUBLICATIONS

Notice of Allowance and Fee(s) Due for U.S. Appl. No. 16/906,056, dated Apr. 27, 2022, (13 pages), United States Patent and Trademark Office, US.

United States Patent and Trademark Office, Unpublished U.S. Appl. No. 12/241,397.

United States Patent and Trademark Office, NonFinal Office Action for U.S. Appl. No. 16/516,026, filed Jul. 9, 2020, (9 pages), U.S.

United States Patent and Trademark Office, NonFinal Office Action for U.S. Appl. No. 16/516,000, filed Aug. 13, 2020, (17 pages), U.S.

NonFinal Office Action for U.S. Appl. No. 16/906,056, dated Oct. 6, 2021, (16 pages), United States Patent and Trademark Office, USA.

NonFinal Office Action for U.S. Appl. No. 17/182,704, dated Jun. 17, 2022, (9 pages), United States Patent and Trademark Office, US.

Notice of Allowance for U.S. Appl. No. 16/928,460, dated Feb. 1, 2023, (11 pages), United States Patent and Trademark Office, US.

Non-Final Office Action for U.S. Appl. No. 18/647,012, dated Nov. 29, 2024, (10 pages), United States Patent and Trademark Office.

Non-Final Office Action for U.S. Appl. No. 18/620,045, dated May 8, 2025, (15 pages), United States Patent and Trademark Office.

Non-Final Office Action for U.S. Appl. No. 18/315,883, dated Dec. 7, 2023, (9 pages), United States Patent and Trademark Office.

* cited by examiner

SYSTEMS AND METHODS FOR PROVIDING EXPANDED CASH MANAGEMENT FUNCTIONALITY VIA A POINT-OF-SALE TERMINAL

CROSS-REFERENCE TO RELATED APPLICATIONS

This patent application claims priority of U.S. Provisional Patent Appl. Ser. No. 62/972,947, filed Feb. 11, 2020, which is incorporated herein by reference in its entirety.

BACKGROUND

Retail establishments have a constant need to optimize the amount of physical cash (e.g., paper currency) and/or coins in circulation on a retail floor (e.g., within cash register tills at checkout locations accessible to customers). Retailers need to ensure that sufficient cash is available at cash register tills to enable completion of cash-based transactions with customers, however the retailers also desire to minimize the amount of cash available at cash register tills, as this cash is exposed to security threats, and this cash cannot be used as leverage in the same way the cash could be utilized if deposited in an account with a financial institution.

BRIEF SUMMARY

To optimize the amount of cash available at cash register tills within Point-of-Sale (POS) terminals of a physical retailer, one or more self-checkout (SCO) POS terminals may be utilized to reallocate cash between cash register tills (e.g., between POS terminals), while a monitoring server maintains real-time, denomination-specific data regarding the movement of cash between POS terminals (e.g., including data indicative of a denomination-specific cash quantity). During reallocation processes, the SCO POS terminals are operated in a cash management mode, during which transaction data generated for cash movement transactions are tagged to enable the monitoring server to distinguish between transactions occurring with customers (transactions executed while the SCO POS terminal is operating in a primary mode) and transactions occurring to reallocate cash to other POS terminals.

Certain embodiments are directed to a method for automatically reallocating physical cash among a plurality of point-of-sale (POS) terminals, the method comprising: storing cash usage forecast data for a plurality of POS terminals, wherein the plurality of POS terminals comprises a first self-checkout (SCO) POS terminal, and wherein the first SCO POS terminal is operable in a primary mode for executing customer-facing transactions and a cash management mode for executing reallocation transactions with other POS terminals of the plurality of POS terminals; monitoring cash usage of each of the plurality of POS terminals; upon determining that the cash usage of a second POS terminal of the plurality of POS terminals does not satisfy cash usage forecast data stored for the second POS terminal, generating reallocation data for moving cash from the first SCO POS terminal to the second POS terminal, wherein the reallocation data comprises: reallocation instructions for transmission to the first SCO POS terminal, wherein the reallocation instructions identify a denomination-specific cash quantity to be transferred and identifies the second POS terminal as the destination for transfer, and wherein the reallocation instructions are executable by the first SCO POS terminal to cause the first SCO POS terminal to dispense the denomination-specific cash quantity while the first SCO POS terminal is operating in the cash management mode; and notification data for transmission to a user computing entity associated with a user authorized to move physical cash between POS terminals of the plurality of POS terminals.

In certain embodiments, the plurality of POS terminals comprises a plurality of SCO POS terminals, wherein the plurality of SCO POS terminals comprises the first SCO POS terminal, and wherein the method further comprises: upon determining that the cash usage of a second POS terminal of the plurality of POS terminals does not satisfy cash usage forecast data stored for the second POS terminal, identifying the first SCO POS terminal of the plurality of SCO POS terminals as satisfying reallocation source criteria for providing the denomination-specific cash quantity to be transferred to the second POS terminal. Moreover, identifying the first SCO POS terminal of the plurality of SCO POS terminals as satisfying reallocation source criteria may comprise: comparing cash usage of each of the plurality of SCO POS terminals with stored cash usage forecast data for each of the plurality of SCO POS terminals; and determining whether removal of the denomination-specific cash quantity from the first SCO POS terminal would cause the cash usage of the first SCO POS terminal to fail to satisfy the cash usage forecast data. In certain embodiments, the method further comprises: upon determining that the cash usage of a second POS terminal of the plurality of POS terminals does not satisfy cash usage forecast data stored for the second POS terminal, determining the denomination-specific cash quantity based at least in part on a comparison between the cash usage for the second POS terminal and the cash usage forecast data for the second POS terminal. In various embodiments, the second POS terminal is a second SCO POS terminal, and wherein monitoring cash usage from each of the plurality of POS terminals comprises receiving cash usage data from the second SCO POS terminal. Moreover, certain methods further comprise receiving reallocation confirmation data from at least one of the first SCO POS terminal or the second POS terminal, wherein the reallocation confirmation data identifies the amount of cash reallocated from the first SCO POS terminal to the second POS terminal; and reconciling the reallocation confirmation data with the reallocation data.

Certain embodiments are directed to a system for automatically reallocating physical cash among a plurality of point-of-sale (POS) terminals, the system comprising one or more memory storage areas; and one or more processors. The one or more processors of certain embodiments are collectively configured to: store cash usage forecast data for a plurality of POS terminals, wherein the plurality of POS terminals comprises a first self-checkout (SCO) POS terminal, and wherein the first SCO POS terminal is operable in a primary mode for executing customer-facing transactions and a cash management mode for executing reallocation transactions with other POS terminals of the plurality of POS terminals; monitor cash usage of each of the plurality of POS terminals; upon determining that the cash usage of a second POS terminal of the plurality of POS terminals does not satisfy cash usage forecast data stored for the second POS terminal, generate reallocation data for moving cash from the first SCO POS terminal to the second POS terminal, wherein the reallocation data comprises: reallocation instructions for transmission to the first SCO POS terminal, wherein the reallocation instructions identify a denomination-specific cash quantity to be transferred and identifies the second POS terminal as the destination for transfer, and wherein the reallocation instructions are executable by the first SCO POS terminal to cause the first SCO POS terminal to dispense the denomination-specific cash quantity while the first SCO POS terminal is operating in the cash management mode; and notification data for transmission to a user computing entity associated with a user authorized to move physical cash between POS terminals of the plurality of POS terminals.

In certain embodiments, the plurality of POS terminals comprises a plurality of SCO POS terminals, wherein the plurality of SCO POS terminals comprises the first SCO POS terminal, and wherein the one or more processors are further configured to: upon determining that the cash usage of a second POS terminal of the plurality of POS terminals does not satisfy cash usage forecast data stored for the second POS terminal, identify the first SCO POS terminal of the plurality of SCO POS terminals as satisfying reallocation source criteria for providing the denomination-specific cash quantity to be transferred to the second POS terminal.

In various embodiments, identifying the first SCO POS terminal of the plurality of SCO POS terminals as satisfying reallocation source criteria comprises: comparing cash usage of each of the plurality of SCO POS terminals with stored cash usage forecast data for each of the plurality of SCO POS terminals; and determining whether removal of the denomination-specific cash quantity from the first SCO POS terminal would cause the cash usage of the first SCO POS terminal to fail to satisfy the cash usage forecast data. In certain embodiments, the one or more processors are further configured to: upon determining that the cash usage of a second POS terminal of the plurality of POS terminals does not satisfy cash usage forecast data stored for the second POS terminal, determine the denomination-specific cash quantity based at least in part on a comparison between the cash usage for the second POS terminal and the cash usage forecast data for the second POS terminal. In certain embodiments, the second POS terminal is a second SCO POS terminal, and wherein monitoring cash usage from each of the plurality of POS terminals comprises receiving cash usage data from the second SCO POS terminal. In various embodiments, the one or more processors are further configured to: receive reallocation confirmation data from at least one of the first SCO POS terminal or the second POS terminal, wherein the reallocation confirmation data identifies the amount of cash reallocated from the first SCO POS terminal to the second POS terminal; and reconcile the reallocation confirmation data with the reallocation data.

Certain embodiments are directed to a computer program product comprising a non-transitory computer readable medium having computer program instructions stored therein, the computer program instructions when executed by a processor, cause the processor to: store cash usage forecast data for a plurality of POS terminals, wherein the plurality of POS terminals comprises a first self-checkout (SCO) POS terminal, and wherein the first SCO POS terminal is operable in a primary mode for executing customer-facing transactions and a cash management mode for executing reallocation transactions with other POS terminals of the plurality of POS terminals; monitor cash usage of each of the plurality of POS terminals; upon determining that the cash usage of a second POS terminal of the plurality of POS terminals does not satisfy cash usage forecast data stored for the second POS terminal, generate reallocation data for moving cash from the first SCO POS terminal to the second POS terminal, wherein the reallocation data comprises: reallocation instructions for transmission to the first SCO POS terminal, wherein the reallocation instructions identify a denomination-specific cash quantity to be transferred and identifies the second POS terminal as the destination for transfer, and wherein the reallocation instructions are executable by the first SCO POS terminal to cause the first SCO POS terminal to dispense the denomination-specific cash quantity while the first SCO POS terminal is operating in the cash management mode; and notification data for transmission to a user computing entity associated with a user authorized to move physical cash between POS terminals of the plurality of POS terminals.

In certain embodiments, the plurality of POS terminals comprises a plurality of SCO POS terminals, wherein the plurality of SCO POS terminals comprises the first SCO POS terminal, and wherein the computer program instructions are further configured to cause the processor to: upon determining that the cash usage of a second POS terminal of the plurality of POS terminals does not satisfy cash usage forecast data stored for the second POS terminal, identify the first SCO POS terminal of the plurality of SCO POS terminals as satisfying reallocation source criteria for providing the denomination-specific cash quantity to be transferred to the second POS terminal. In certain embodiments, identifying the first SCO POS terminal of the plurality of SCO POS terminals as satisfying reallocation source criteria comprises: comparing cash usage of each of the plurality of SCO POS terminals with stored cash usage forecast data for each of the plurality of SCO POS terminals; and determining whether removal of the denomination-specific cash quantity from the first SCO POS terminal would cause the cash usage of the first SCO POS terminal to fail to satisfy the cash usage forecast data.

In various embodiments, the computer program instructions are further configured to cause the processor to: upon determining that the cash usage of a second POS terminal of the plurality of POS terminals does not satisfy cash usage forecast data stored for the second POS terminal, determine the denomination-specific cash quantity based at least in part on a comparison between the cash usage for the second POS terminal and the cash usage forecast data for the second POS terminal. In certain embodiments, the second POS terminal is a second SCO POS terminal, and wherein monitoring cash usage from each of the plurality of POS terminals comprises receiving cash usage data from the second SCO POS terminal. In various embodiments, the computer program instructions are further configured to cause the processor to: receive reallocation confirmation data from at least one of the first SCO POS terminal or the second POS terminal, wherein the reallocation confirmation data identifies the amount of cash reallocated from the first SCO POS terminal to the second POS terminal; and reconcile the reallocation confirmation data with the reallocation data.

Certain embodiments are directed to a method for automatically reallocating physical cash among a plurality of point-of-sale (POS) terminals, the method comprising: operating a first self-checkout (SCO) POS terminal in a primary mode for executing customer-facing transactions; receiving, at the first SCO POS terminal, reallocation instructions from a monitoring server, wherein the reallocation instructions identify a second POS terminal for receiving a cash transfer from the first SCO POS terminal and identifying a denomination-specific cash quantity to be transferred to the second POS terminal; in response to receipt of user input, changing operation of the first SCO POS terminal from the primary mode to a cash management mode for executing reallocation transactions with others of the plurality of POS terminals; while operating in the cash management mode, executing the reallocation instructions via the first SCO POS terminal to dispense the denomination-specific cash quantity from the first SCO POS terminal; update data of an amount of cash available within the first SCO POS terminal to reflect the denomination-specific cash quantity dispensed from the first SCO POS terminal; and transfer, from the first SCO POS terminal, reallocation confirmation data to the monitoring server, wherein the monitoring server is configured to reconcile the reallocation confirmation data against secondary reallocation confirmation data received from the second POS terminal after the second POS terminal receives the denomination-specific cash quantity dispensed from the first SCO POS terminal.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1A:
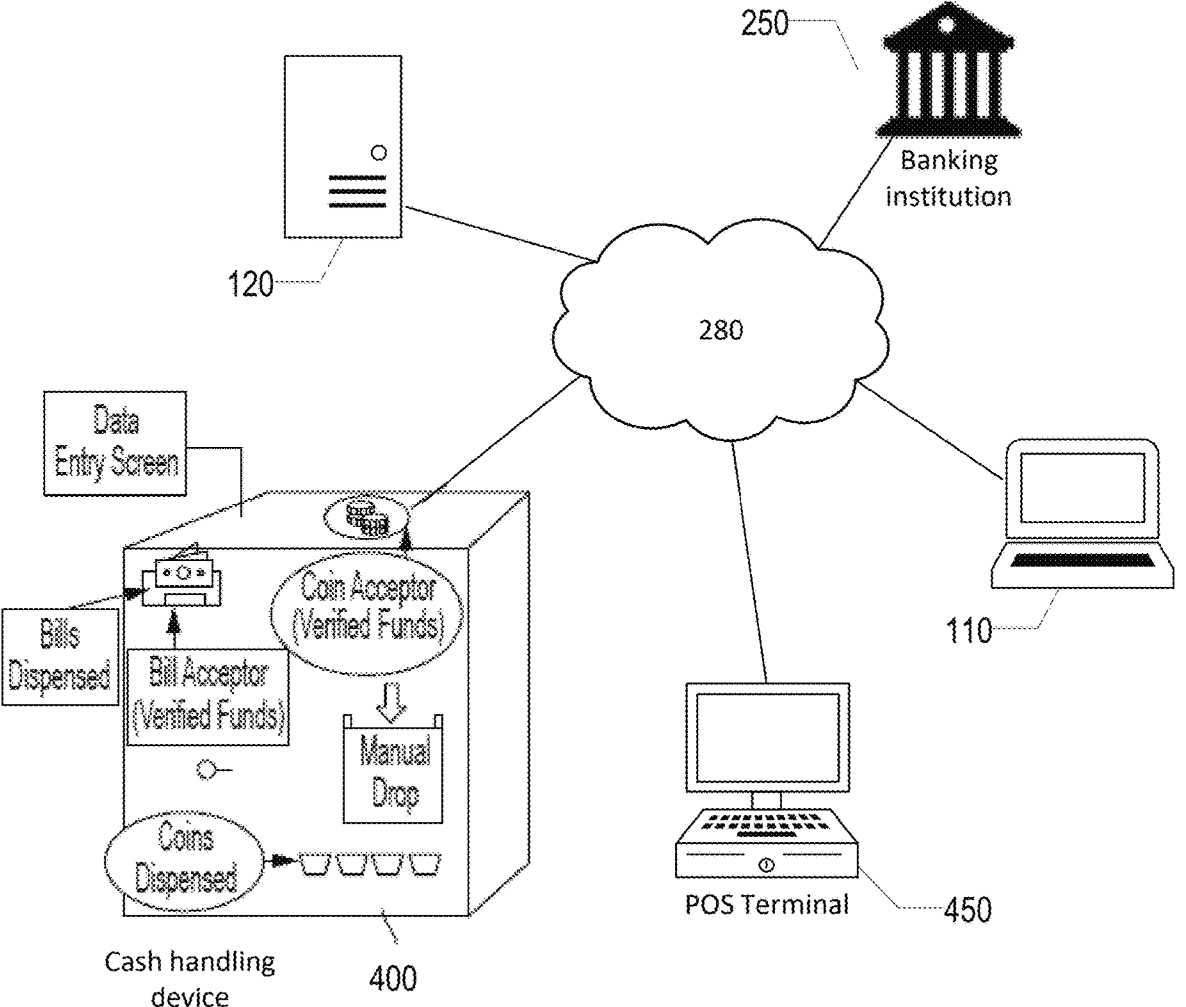
FIG. 1A illustrates a network environment in which data may be transferred regarding the functionality of a cash handling device according to certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Certain embodiments enable Self-Checkout (SCO) point-of-sale (POS) terminals to provide one or more cash handling device (e.g., recycler) functionalities to facilitate the optimization of a total amount of cash available within circulation of a retail establishment. The SCO POS terminals may operate in association with cash handling devices, or in place of cash handling devices in certain implementations. Specifically, certain embodiments utilize the security, automation, and cash verification functionalities of SCO POS terminals to maintain cash within a secure environment therein, and for dispensing defined quantities of cash that may be provided to other POS terminals, for example, when replenishing cash within those other POS terminals, for dispensing cash to those other POS terminals at the start of a business day, and/or the like. Various embodiments monitor cash usage, dispensing, and/or the like from the SCO POS terminal via a monitoring server as discussed herein, which may be configured to attribute various quantities of dispensed cash and/or received cash (e.g., at a denominational level, such as indicating the number of $1 bills dispensed, the number of $20 bills dispensed, and/or the like) to other POS terminals in accordance with certain dispensing transactions. Accordingly, transactions in which cash is provided from a first SCO POS terminal to a second SCO POS terminal (and/or another POS terminal) may be monitored to ensure the amount of cash dispensed from the first SCO POS terminal matches the amount of cash received at the second SCO POS terminal.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

Figure 1B:
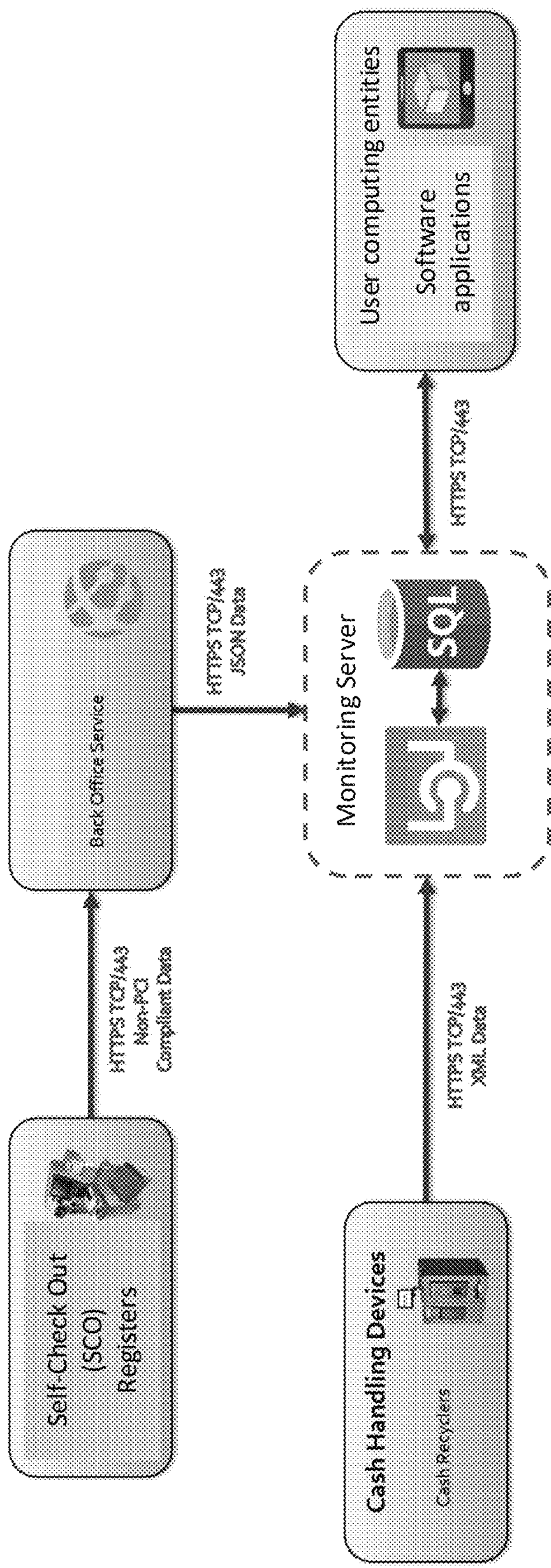
FIG. 1B illustrates electronic communication connections between various components within an example network according to certain embodiments.

FIGS. 1A-1B provide an illustration of an exemplary embodiment of the present invention. As shown in FIGS. 1A-1B, certain embodiments include one or more monitoring servers 120, one or more user computing entities 110, one or more cash handling devices as discussed herein, one or more SCO POS terminals, one or more networks 280 enabling communication among computing devices and a banking institution (e.g., a banking institution server system), and/or the like. In various embodiments, certain of these devices (e.g., the SCO POS terminal and/or other POS terminals within a retailer may be in communication with the monitoring server 120 via a back-office service hosted locally at the retail establishment). Each of these components, entities, devices, systems, and similar words used herein interchangeably may be in direct or indirect communication with, for example, one another over the same or different wired or wireless networks. Additionally, while FIGS. 1A-1B illustrate the various system entities as separate, standalone entities, the various embodiments are not limited to this particular architecture.

Monitoring Server

Figure 2:
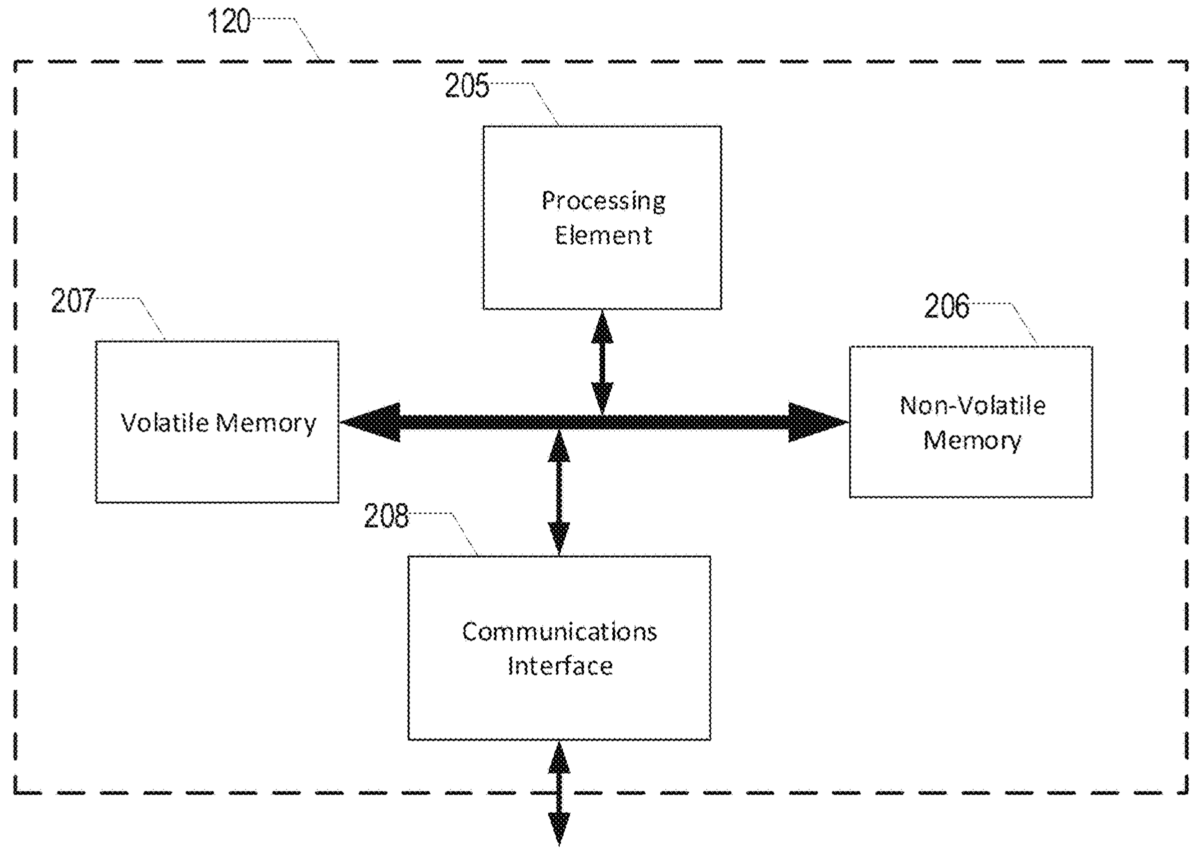
FIG. 2 schematically illustrates features of a monitoring server according to certain embodiments.

FIG. 2 provides a schematic of a monitoring server 120 according to one embodiment of the present invention. In one embodiment, the monitoring server 120 may be in network communication with one or more cash handling devices for monitoring transactions occurring in association with those cash handling devices, one or more banking institutions to transmit transaction data to appropriate banking institutions and/or one or more user computing entities 110 to provide various summary data thereto. In certain embodiments, the monitoring server 120 may be operable in association with other computing devices and/or platforms (e.g., operable via third parties, such as banking institutions' online banking platforms) to accomplish certain functions (e.g., user authentication) to retrieve certain data, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the monitoring server 120 may include or be in communication with one or more monitoring server data repositories and/or one or more processing elements 205 (also referred to as processors, processing circuitry, processing device, and/or similar terms used herein interchangeably) that communicate with other elements within the monitoring server 120 via a bus, for example. In certain embodiments, the monitoring server data repositories may maintain a wide variety of data accessible to the monitoring server 120, such as user-specific items (e.g., user (login) ID, password (or other authentication credential(s)), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 206, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the monitoring server 120 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 207, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring server 120 with the assistance of the processing element 205 and operating system.

As indicated, in one embodiment, the monitoring server 120 may also include one or more communications elements/interfaces 208 for communicating with various computing entities, such as by communicating data, content, information, and/or similar terms used herein interchangeably that can be transmitted, received, operated on, processed, displayed, stored, and/or the like. For instance, the monitoring server 120 may communicate with one or more user computing entities 110, one or more cash handling devices, one or more networks 280, one or more banking institutions' computing systems, and/or the like.

In certain embodiments, the monitoring server 120 may be configured to receive data from a plurality of data sources with respect to cash inventory stored at a particular cash handling device, a particular POS terminal, and/or the like. For example, the cash handling device and/or POS terminal may provide data indicative of aggregate inputs and outputs of cash to the machine, while a user computing device may provide data indicative of how the aggregate inputs and outputs are divided among a plurality of retail tills (or registers, the terms being utilized herein interchangeably) (e.g., usable with respective POS devices). Accordingly, the monitoring server 120 may be configured to provide till-level inventory tracking configurations based at least in part on the aggregate amount of cash input to or output from a particular cash handling device and/or POS terminal, as well as manually generated data provided from a user computing entity indicative of how the cash was distributed from/to a various POS terminals.

As indicated, in one embodiment, the monitoring server 120 may also include one or more communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The monitoring server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the monitoring server 120 may include or be in communication with one or more input elements, such as a keyboard input, a mouse input, a touch screen/display input, motion input, movement input, audio input, pointing device input, joystick input, keypad input, and/or the like. In one embodiment, the monitoring server 120 may also include or be in communication with one or more output elements (not shown), such as audio output, video output, screen/display output, motion output, movement output, and/or the like.

As will be appreciated, one or more of the monitoring server's 120 components may be located remotely from other monitoring server 120 components, such as in a distributed system. Furthermore, one or more of the components may be combined and additional components performing functions described herein may be included in the monitoring server 120. Thus, the monitoring server 120 can be adapted to accommodate a variety of needs and circumstances. As will be recognized, these architectures and descriptions are provided for exemplary purposes only and are not limiting to the various embodiments.

Exemplary User Computing Entity

In one embodiment, a user may be an individual, a representative of a customer, such as a company or organization, and/or the like who wants to deposit and/or withdraw cash from a cash handling device 400 as discussed above. The user may interact with a cash handling device 400 via a user interface thereon, and/or the user may interact with a user computing entity 110 to obtain information/data regarding one or more accounts to which the user has access. As will be recognized, an account associated with a cash handling device 400 may be any of a number of different account types, including a bank-owned cash account, a non-bank owned cash account, and/or the like. Accounts may be associated and/or linked with any of a variety of banking institutions holding accounts on behalf of a customer. Moreover, an account could be associated with more than one user (e.g., a plurality of employees associated with a customer holding an account), and each user may have different account access credentials (e.g., a first user may have withdrawal and deposit access and a second user may have deposit only access to an account). Moreover, each user may have access to an account via different access identifiers (e.g., different user identifiers), or in certain embodiments each user may have access to the account via an identical access number. In other embodiments, a single user identifier may be associated with more than one account (e.g., accounts associated with a plurality of departments within a commercial customer).

Figure 3:
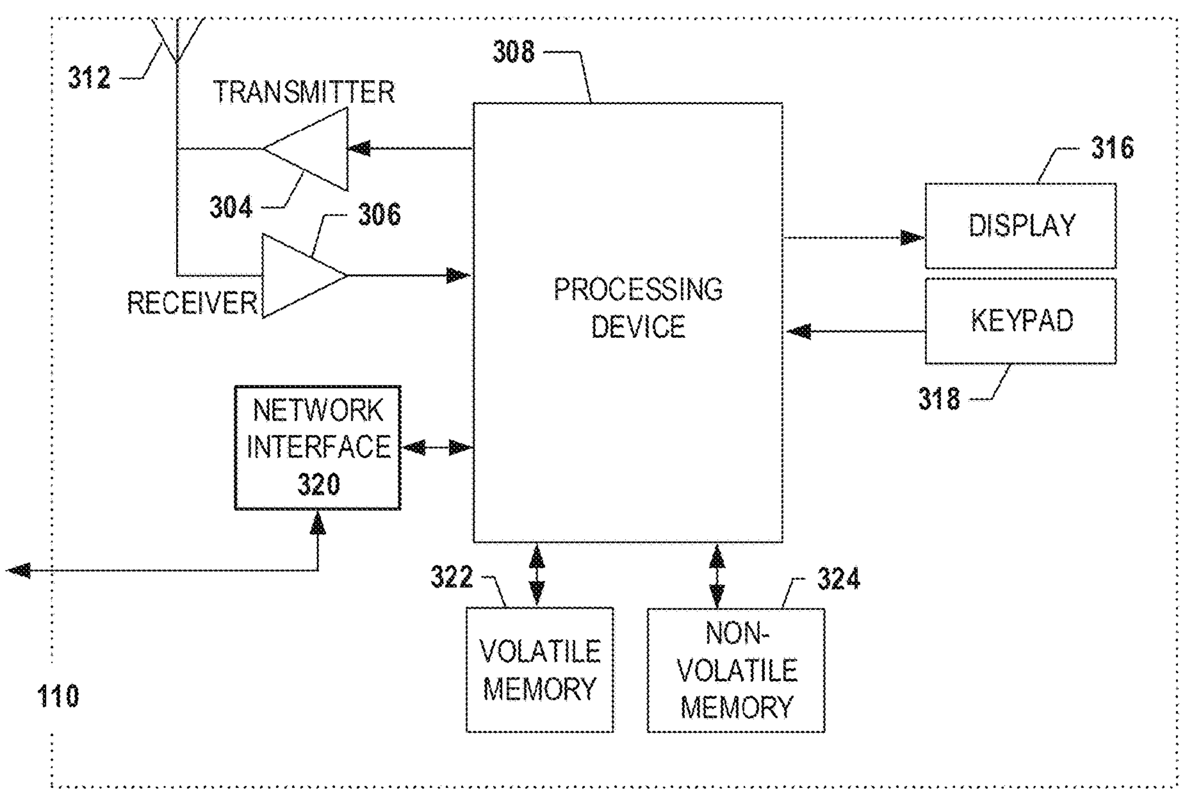
FIG. 3 schematically illustrates features of a handheld device according to certain embodiments.

The user computing entity 110 includes one or more components that are functionally similar to those of the monitoring server 120. FIG. 3 provides an illustrative schematic representative of a user computing entity 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the monitoring server 120. In a particular embodiment, the user computing entity 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the monitoring server 120 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the user computing entity 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the user computing entity 110 to interact with and/or cause display of information/data from the monitoring server 120, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 316) may be configured for displaying access credentials that may be presented to a cash handling device 400 to enable the user to gain account access via the cash handling device 400. For example, the user interface of the user computing entity 110 may be utilized to display a QR code, a bar code, an image, and/or the like that is machine-readable and indicative of the user's access credentials. Similarly, the user computing entity 110 may be configured for storing access credentials thereon, and transmitting those access credentials via any of a variety of wireless data transmission protocols (e.g., Bluetooth, Wi-Fi, NFC, and/or the like) to the cash handling device to provide access credentials for the user to the cash handling device 400.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the monitoring server 120 and/or various other computing entities.

As will be recognized, the user computing entity 110 may include one or more components or functionality that are the same or similar to those of the monitoring server 120, as described in greater detail above. As will be recognized, these architectures and descriptions are provided for exemplary purposes only and are not limiting to the various embodiments.

Cash Handling Device Hardware

Figure 4:
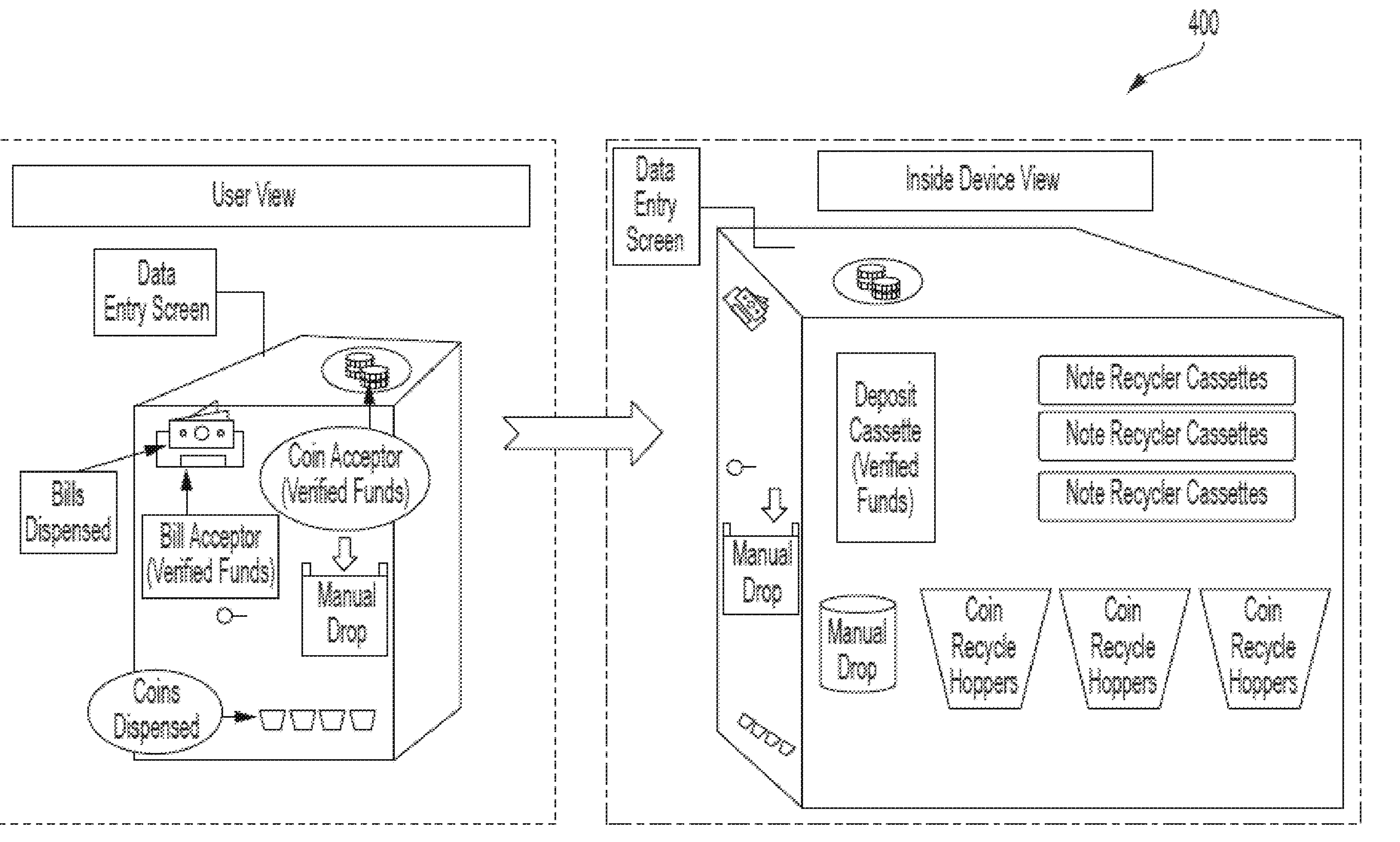
FIG. 4 schematically illustrates features of a cash handling device according to certain embodiments.

An example cash handling device 400 is shown schematically at FIG. 4. As shown therein, components of the cash handling device 400 are disposed within and/or on a housing. The cash handling device 400 may comprise a user interface (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the cash handling device 400 may comprise one or more secure information storage areas configured to securely store user data (e.g., user identifiers, user passwords/passcodes, user biometric data, and/or the like) to prevent unauthorized access to such user data. These secure information storage areas may be accessible to certain authorized users, thereby enabling those authorized users to add or remove user data, for example, as new employees/users become authorized to interact with the cash handling device 400 and/or as prior employees/users are no longer authorized to interact with the cash handling device 400.

The cash handling device 400 may further comprise one or more currency outputs (e.g., a coin dispenser, such as a rolled coin dispenser or a loose coin dispenser, a note dispenser, such as a loose note dispenser or a bound-note dispenser, and/or the like), one or more currency and/or negotiable instrument inputs (e.g., a coin recycler, a check/note scanner/recycler, a deposit cassette, and/or the like), a receipt printer, and/or the like. As discussed herein, the cash handling device 400 may additionally comprise a retail till receiving portion configured to receive a retail till of a POS terminal during receipt and/or distribution of cash stored within the retail till. In certain embodiments, the retail till receiving portion may further comprise a retail till identifier scanner configured to obtain retail till identifier data (indicative of an identity of the retail till and/or the associated POS terminal of the retail till) for tills located therein, such that data indicative of cash added to and/or removed from the retail till may be associated with the retail till identifier.

The cash handling device components collectively enable a user (e.g., a representative of a particular commercial establishment customer having an account accessible via the cash handling device 400) to deposit and/or withdraw funds from the cash handling device 400 (which may result in corresponding changes to an account balance in an account held at a particular banking institution for the commercial establishment), for example, when emptying or filling a retail till of a POS terminal. In certain embodiments, the cash handling device 400 may enable users to withdraw currency in requested quantities and denominations (e.g., requested quantities of each of a plurality of denominations). Users may interact with the cash handling device 400 via the one or more user interface mechanisms to (1) provide user identifying data (e.g., via the one or more data readers, the PIN pad, a touch screen, and/or the like), and (2) to provide data indicative of a requested transaction to be performed with the cash handling device 400.

In certain embodiments, a plurality of users may be associated with a single account with the cash handling device 400, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the cash handling device 400, on a memory within a physical identification token (e.g., a card) carried by the user, and/or the like.

With reference to FIG. 4, which illustrates a schematic view of various components of a cash handling device 400 according to one embodiment, the cash handling device 400 may comprise one or more components of a note (e.g., note) circulation system and one or more components of a coin circulation system.

In the illustrated embodiment, the note circulation system encompasses a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recycler cassettes and/or deposit cassettes (illustrated in FIG. 4) are counted, imaged, and/or otherwise verified to monitor the quantity of notes deposited/withdrawn, as well as the denomination of those notes. Through the verification mechanism of the note acceptor, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system, and the user may manually provide information regarding the denomination of the particular notes provided to the cash handling device 400 via the manual drop.

As is particularly relevant for deposits, the note acceptor may be configured to segregate notes by denomination prior to providing those notes to a note recycler and/or deposit cassette. The segregated notes may be stored in separate storage locations (e.g., separated portions of a recycler cassette and/or separated portions of a deposit cassette) such that the notes may be easily recycled based on denomination for later transactions if needed. In certain embodiments, the separate storage locations may comprise separate deposit cassettes, separate recycler cassettes, and/or separated portions of a deposit cassette and/or recycler cassette. As a specific example utilized with U.S. currency, a cash handling device 400 may comprise two cassettes (deposit cassettes, recycler cassettes, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a cash handling device 400 may comprise deposit only cassettes having the above-referenced configuration, recycler only cassettes having the above-referenced configuration (except for the deposit-only overflow cassette) or may have two sets of cassettes having the above-referenced configuration (e.g., a first set of deposit cassettes having the above-referenced configuration and a second set of recycler cassettes having the above-referenced configuration, but without the overflow cassette). It should be understood that the configuration of specific denomination-specific cassettes mentioned above is presented as an example only, and any combination of denomination-specific cassettes may be utilized.

In certain embodiments, all notes received from the note acceptor during deposit transactions are first directed to a note recycler cassette for storage therein. Notes may be redirected from a recycler cassette to a deposit cassette to remove those notes from circulation upon the occurrence of one or more trigger events, such as a quantity of notes (e.g., a quantity of a given denomination of notes) exceeding a threshold quantity or upon receipt of user input requesting that notes are moved to the deposit cassette. As discussed herein, the trigger event utilized to redirect notes from a recycler cassette to a deposit cassette may be dynamic and may be adjusted based at least on part on cash usage models established and/or maintained at the monitoring server. For example, on a first day, a first threshold quantity of notes may be utilized as a trigger event for redirecting funds to a deposit cassette, and on a second day, a second threshold quantity of notes, different from the first threshold quantity of notes, may be utilized as a trigger event for redirecting funds to a deposit cassette. Thus, the model maintained at the monitoring server may adjust the amount of cash available for circulation within a retail environment based at least in part on factors considered in maintaining the applicable model.

Moreover, as discussed herein, movement of notes to a deposit cassette may itself be a trigger event for various tasks to be performed by the cash handling device 400 or a networked monitoring system, such as transmitting data to a banking institution to direct funds into a particular account at the banking institution.

In certain embodiments, each time notes are moved within the cash handling device 400, the notes may pass through a quantity and/or denomination verification system to automatically monitor the amount of currency moving between the various portions of the cash handling device 400, thereby enabling the cash handling device 400 to maintain an accurate count of the amount of currency in each denomination contained therein.

With reference now to the coin circulation system, the cash handling device 400 may comprise a coin acceptor configured to accept coins deposited by a user of the cash handling device 400 (e.g., accepting rolled coins and/or loose coins). The coin acceptor may have a rejection tray configured to return any unrecognizable coins deposited by the user. Moreover, the coin acceptor comprises a counting and/or verification system configured for counting the quantity and denomination of coins provided via the coin acceptor. Coins may then be passed to one or more coin recycle hoppers (e.g., which may comprise open trays, roll-creating hoppers, and/or the like) for storage within the cash handling device 400. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays (e.g., coin roll dispensing trays or loose coin dispensing trays) for presentation to the user.

Like the note recyclers mentioned above, the cash handling device 400 may comprise a plurality of denomination specific coin hoppers for storage of deposited coins. For example, a cash handling device 400 may comprise two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A cash handling device 400 may comprise deposit only coin hoppers having the above configuration, recycler coin hoppers having the above configuration, or both recycler coin hoppers and deposit coin hoppers having the above configuration. Moreover, the configuration of denominations of coin hoppers discussed herein is provided merely as an example, any combination of denomination-specific coin hoppers may be utilized.

Moreover, the cash handling device 400 may comprise a manual drop circulation system comprising a manual drop acceptor configured to accept notes and/or negotiable instruments provided by the user, and a manual drop storage cassette. The manual drop acceptor may operate in conjunction with the user interface, such that the manual drop may associate user-provided information regarding the quantity of a particular manual drop (e.g., value, quantity of a particular currency, and/or the like) with notes accepted via the manual drop. In certain embodiments, the manual drop cassette may be configured to separate each collection of notes accepted via the manual drop, such that the user-provided information regarding the quantity of currency provided via the manual drop may remain reflective of an amount of currency stored within a particular separated collection of notes. The manual drop may be a deposit only system, such that notes are not recycled to users from the manual drop cassette.

Although not shown, the cash handling device 400 may be configured for automatically providing cash into a cashier tray (also referred to herein as a retail till) (e.g., a tray to be utilized with a cash register at a POS terminal 450). In such embodiments, the cashier tray may be supported within the cash handling device 400, and the cash handling device 400 may selectably deposit quantities of notes and coins of select denominations into segmented portions of the cashier tray.

Moreover, the cash handling device 400 comprises a receipt printer configured for printing physical receipts that may be usable by individual users and/or during change order processing as discussed herein.

The cash handling device 400 may be configured such that at least a portion of the cash contained therein is bank-owned. This bank owned cash is not associated with any one or more customers' account(s), thereby enabling credits to be given to a user's account upon receiving a physical cash deposit at the cash handling device. Similarly, credit is not deducted from the user's account until and unless the user withdraws physical cash from the bank owned cash portion of the cash handling device 400.

In certain embodiments, the cash handling device 400 is configured such that only a portion of the total cash contained within the cash handling device 400 is bank-owned and accordingly the cash handling device 400 defines a plurality of cash storage locations therein, including at least one storage location for bank owned cash 400 and another storage location for customer (depositor) owned cash. As just one example, bank owned cash may be stored within a deposit cassette (which may not define an outlet for cash), while cash within a note recycler and/or a coin recycler (having both deposit and withdrawal functionalities) may remain depositor owned. In certain embodiments, the cash handling device 400 comprises a verification mechanism for counting the quantity and value of notes being transferred into the deposit cassette or other storage location associated with bank-owned-cash. Accordingly, the cash handling device 400 is configured to utilize only verified funds that have been specifically counted and valued via the verification mechanism for bank-owned-cash.

In certain embodiments, the cash handling device 400 may be configured to enable deposits and withdrawals from bank owned cash portions by various users. Accordingly, the bank owned cash portion of the cash handling device 400 may encompass at least a note recycler (and/or a coin recycler) and may additionally comprise a deposit cassette in certain embodiments.

Cash Handling Device Controller

A cash handling device 400 having the physical configuration discussed herein may have one or more onboard computing controllers configured for performing various functions and/or for controlling the functionality of various components of the cash handling device 400. In one embodiment, the cash handling device controller is embodied as a computing entity that may have a configuration similar to the user computing entity 110 discussed above, and which may be configured to support processing in connection with deposit and withdrawal transactions for funds via the cash handling device 400. The one or more cash handling device controllers may include computing device(s) that are local to a corresponding cash handling device 400 and/or computing device(s) that are remotely located. At least one of the cash handling device controllers may be configured to access and store information/data in at least one of one or more datastores to perform processing supported by the cash handling device 400.

As just one example, the cash handling device controller may be configured to monitor the amount of each of a plurality of denominations of cash that are dispensed and/or collected during a deposit or withdrawal transaction. When dispensing cash into a retail till for a POS terminal 450, the cash handling device controller may store a till identifier for which dispensing is performed, and may store data indicative of the amount of cash (and the denominations of those distributions) dispensed into the retail till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing. Similarly, when receiving cash deposited from a retail till, the cash handling device controller may store a till identifier for which dispensing is performed, and may store data indicative of the amount of cash (and the denominations of those deposits) deposited from the retail till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing.

Exemplary POS Terminal

A POS terminal 450 may be configured for receiving and/or dispensing cash from an included retail till during one or more transactions. A POS terminal 450 may be embodied as a self-checkout (SCO) terminal 451, specifically configured for operation with/by a retail customer. Particularly for POS terminals 450 configured for use in SCO implementations, the POS terminal 450 limits user access to cash stored therein by accepting cash via a cash acceptor mechanism (e.g., an acceptor slot) and dispensing cash via a cash dispensing mechanism (e.g., a dispensing slot).

In other embodiments, a POS terminal 450 may be specifically configured for operation with/by a retail employee helping individual retail customers during transactions. The POS terminal 450 may comprise one or more user interfaces (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the POS terminal 450 hardware may comprise one or more secure information storage areas configured to securely store data, such as transaction data, cash content data, and/or the like.

The POS terminal 450 may further comprise one or more currency outputs (e.g., a coin dispenser, such as a loose coin dispenser, a note dispenser, such as loose note dispenser, and/or the like), one or more currency intakes (e.g., a coin acceptor, a check/note scanner/acceptor, and/or the like), a receipt printer, and/or the like. The POS terminal 450 (specifically SCO POS terminals 451) may additionally comprise one or more cash recycler portions configured to store cash, separated by denomination, therein. The cash recycler portions may be configured to accept cash provided to the POS terminal 450 and/or to dispense cash from the POS terminal 450, for example, as change to a customer during a transaction. As discussed herein, the cash recycler portion may be configured as a Last-In-First-Out configuration for each denomination, such that the most recently received bill for a particular denomination is the first bill to be dispensed during the same or a later transaction.

The POS terminal 450 (such as SCO POS terminals 451) may comprise a note circulation system encompassing a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recyclers may be counted, imaged, and/or otherwise verified to monitor the quantity of notes provided/withdrawn from the POS terminal 450, as well as the denomination of those notes.

As is particularly relevant for deposits, the note acceptor may be configured to segregate notes by denomination prior to providing those notes to a note recycler. The segregated notes may be stored in separate storage locations (e.g., separated portions of a recycler) such that the notes may be easily recycled based on denomination for later transactions if needed.

Moreover, the POS terminal 450 may comprise a POS terminal controller configured for causing the POS terminal cash recycler to deposit and/or accept cash in applicable amounts for a particular transaction. In certain embodiments, the POS terminal controller may have a configuration similar to the cash handling device controller, such that the POS terminal controller comprises one or more non-transitory memory storage areas, one or more processors, one or more network connection mechanisms, and/or the like. Accordingly, the POS terminal controller may be in electronic communication (e.g., via a network) with the cash handling device controller, the monitoring server, and/or the like. Such network connections thereby enable the monitoring server to provide data directly to a POS terminal (and vice versa), for example, so as to update data representative of an amount of BOC contained within the POS terminal 450, and/or to update data enabling the POS terminal 450 to distribute BOC during transactions.

Exemplary Networks

In one embodiment, any two or more of the illustrative components of the architecture of FIGS. 1A-1B may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, process interaction over a network may be synchronous or asynchronous: synchronous-processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous-processes are decoupled and mechanisms include message queues and file transfers.

Example System Operation

Figure 5:
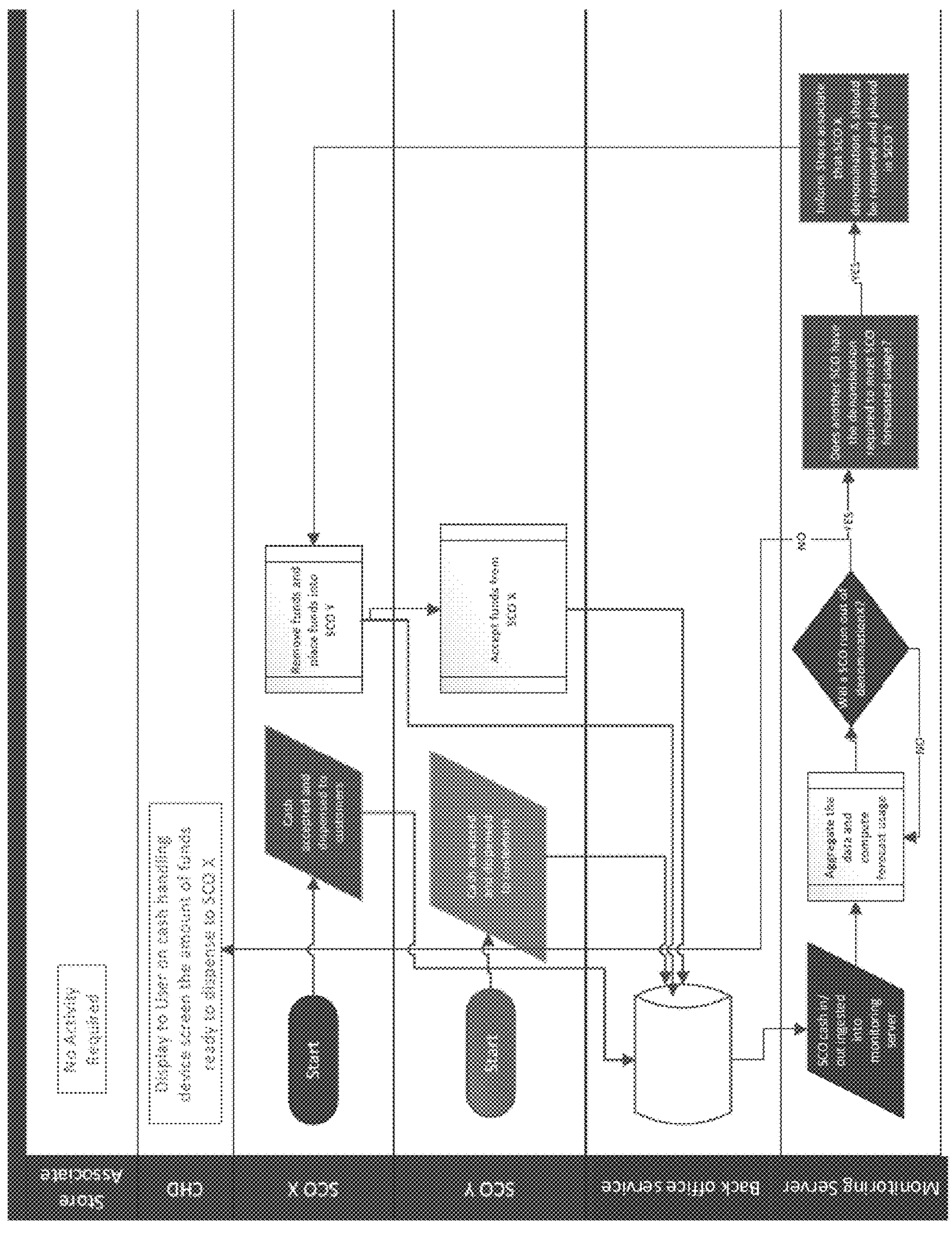
FIG. 5 illustrates operations for distributing cash from a first SCO POS terminal to other POS terminals in accordance with certain embodiments.
Figure 6:
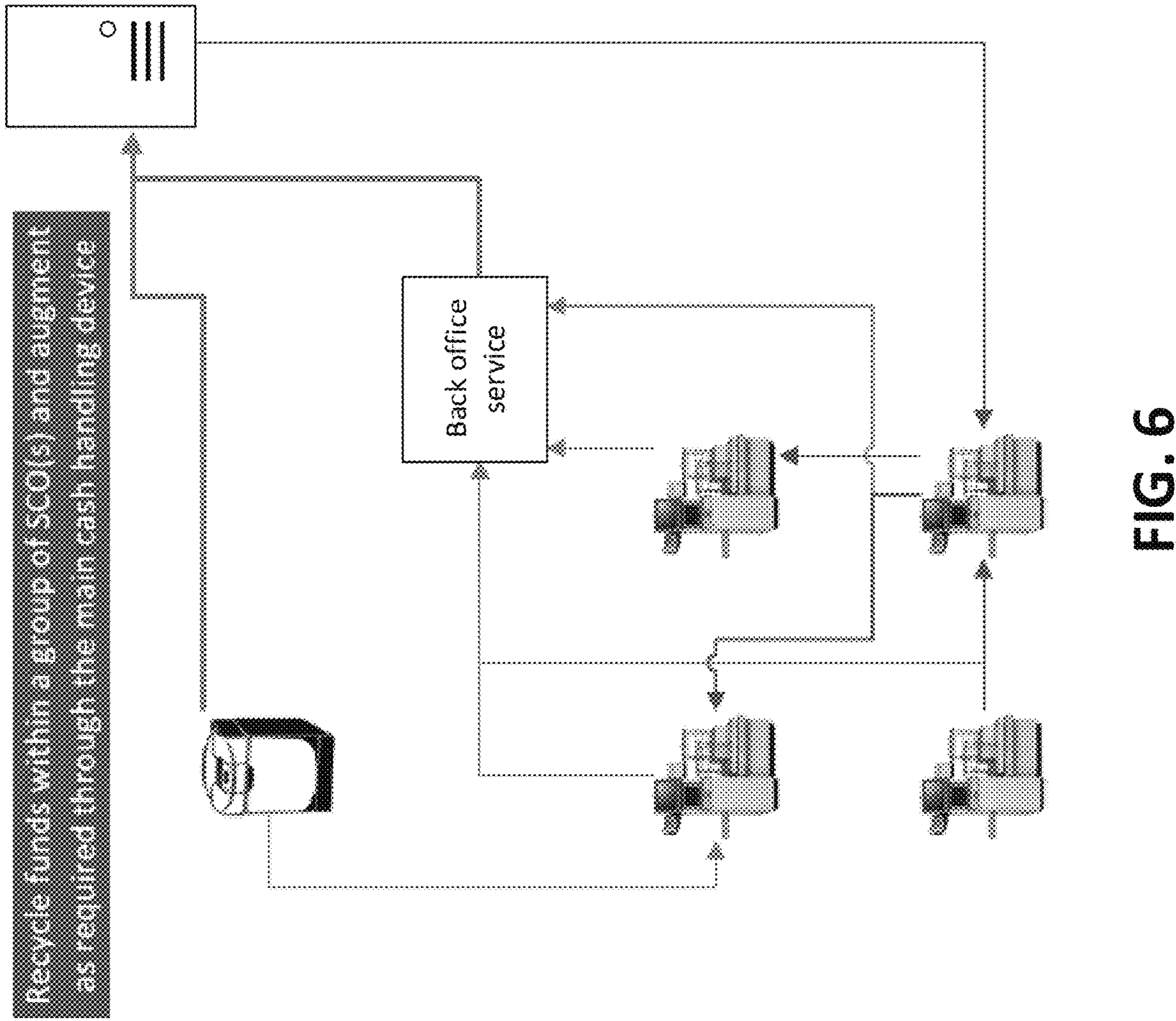
FIG. 6 illustrates example data connections between various devices of a single retail establishment in accordance with certain embodiments.
Figure 7A:
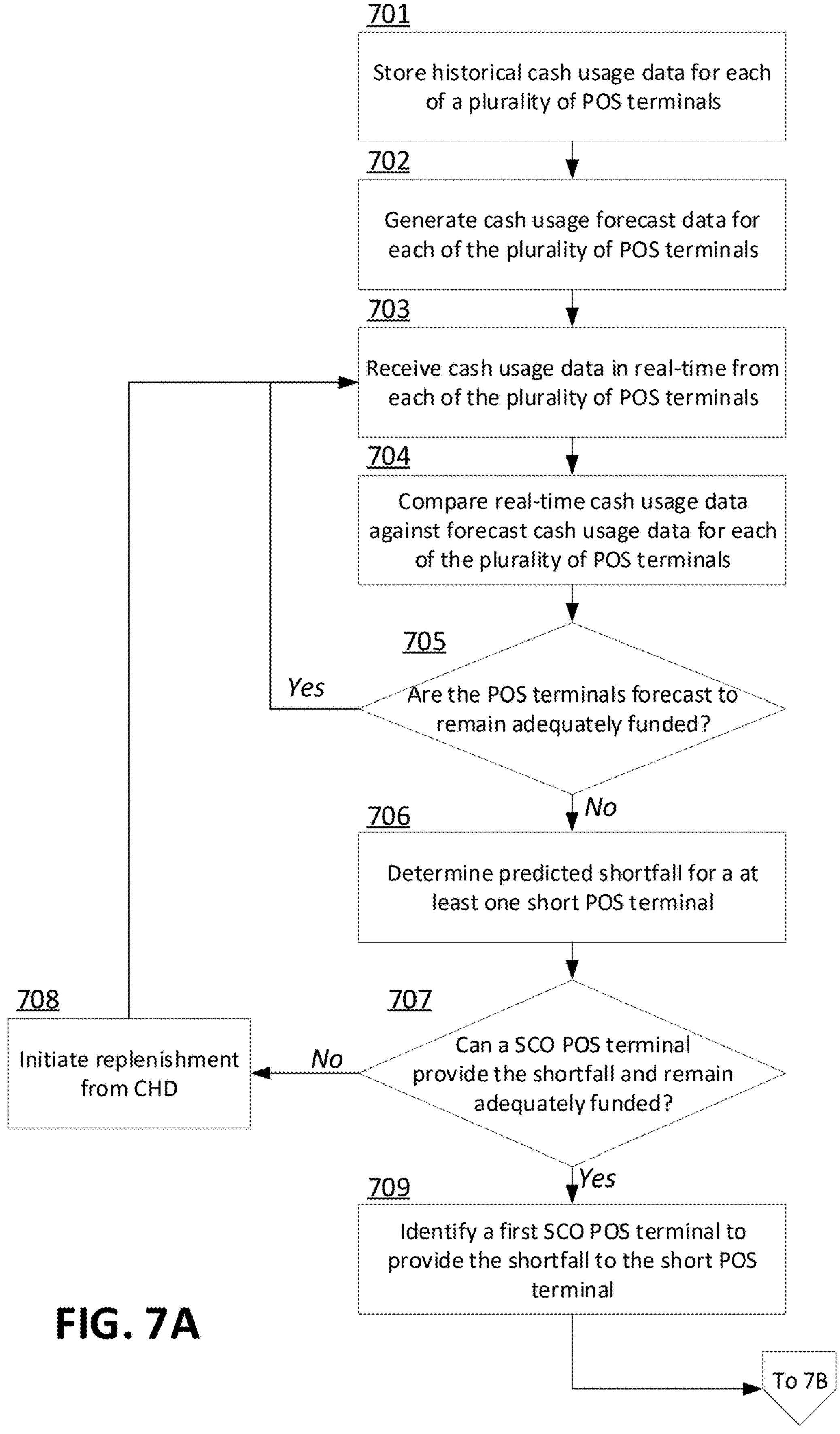
FIGS. 7A-7B are collectively a flowchart illustrating example processes according to certain embodiments.
Figure 7B:
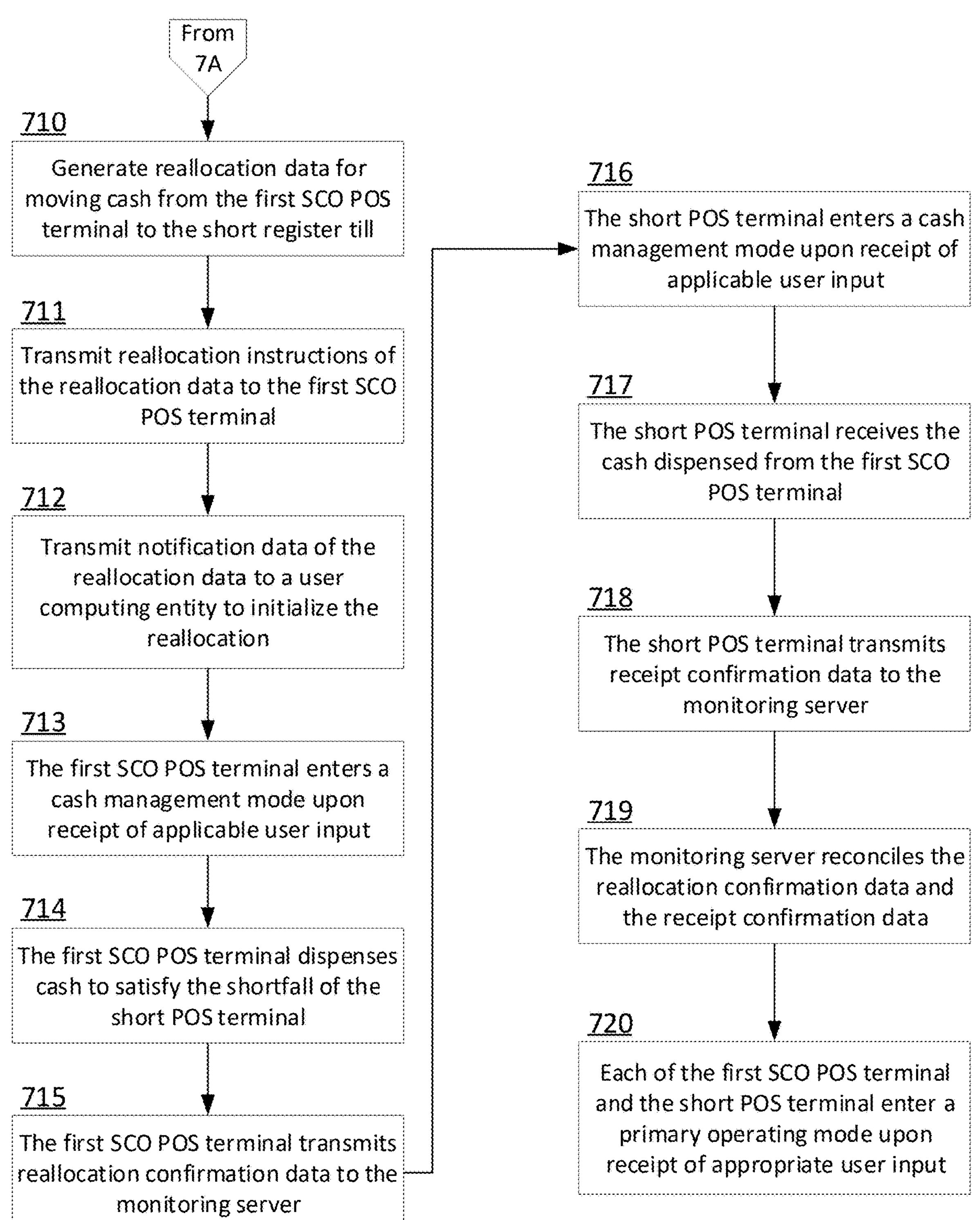

Example operations are now described in reference to FIGS. 5-7B. FIG. 5 illustrates an example data flow through which cash is transferred from a first SCO POS terminal 451 to a second SCO POS terminal 451, and wherein the monitoring server 120 is monitoring the amount of cash within each SCO POS terminal 451 relative to predicted cash usage. Upon determining that the amount of cash of a particular denomination within a particular SCO POS terminal 451 is predicted to drop below a defined minimum level (e.g., the number of $1 bills within an SCO POS terminal is predicted to drop below the defined minimum level), the monitoring server 120 identifies another SCO POS terminal 451 having sufficient funds of the particular denomination (e.g., a sufficient number of $1 bills, following the prior example) to provide additional funds to the particular SCO POS terminal 451 while maintaining adequate funds to support an expected usage at the other SCO POS terminal 451. It should be understood that a forecast shortfall of funds may encompass a plurality of denominations (e.g., $1 bills and $5 bills), and each denomination may be subject to a different forecast shortfall (e.g., $1 bills are subject to a $243 forecast shortfall and $5 bills are subject to a $60 forecast shortfall). In such circumstances, the monitoring server 120 may seek to alleviate all forecast shortfalls for all denominations via a single cash reallocation (from a single SCO POS terminal 451 to another POS terminal 450). Communications between the various SCO POS terminals 451, one or more cash handling devices 400 (if applicable) and the monitoring server 120 may be provided in accordance with the configuration of FIG. 6. FIGS. 7A-7B illustrate detailed processes involved in transferring cash between POS terminals 450 (from an SCO POS terminal 451 to a second POS terminal 450—which may or may not have SCO capabilities).

At least in part via communications with the monitoring server, the SCO POS terminals 451 may be operable in two modes-a primary mode in which the SCO POS terminal 451 operates as a traditional SCO terminal, usable by retail customers to complete purchase transactions through the device. A second, cash management mode of the SCO POS terminals 451 may be accessible to authorized users identified via user authorization credentials to utilize the SCO POS terminal 451 to dispense cash to be provided to other POS terminals 450 (e.g., other SCO POS terminals 451, traditional employee-operated POS terminals, and/or the like); to accept cash received from other POS terminals 450, and/or for providing other functions that may be performed by other cash handling devices. In other embodiments, the SCO POS terminal 451 may have a single operating mode, and the monitoring server 120 may be configured for performing appropriate cash tracking to enable cash management transactions while the SCO POS terminal 450 operates in a primary operating mode.

During cash management transactions performed by the SCO POS terminal 451, transaction data may be provided to the monitoring server, which may provide a high-level overview of cash utilization via a plurality of POS terminals 450 within a retail establishment (it should be understood that the monitoring server may be configured to provide analogous functionality to a plurality of retail establishments), and/or to generate cash dispensing instructions for a SCO POS terminal 451, to be executed during one or more cash management transactions with the SCO POS terminal 451, to move cash physically to other POS terminals 450 while tracking the cash movement via the monitoring server 120.

SCO POS terminals 451 may comprise a plurality of denomination-specific recyclers and recycler cassettes capable of dispensing and/or receiving specific denominations of cash. These denomination-specific recyclers may be utilized to provide denomination-specific cash dispensing, such that specific quantities of specific denominations of cash (e.g., 122 $1 bills, 14 $5 bills, and 10 $10 bills) may be provided to other POS terminals 450 during one or more cash management transactions. Moreover, such transactions may proceed in association with transaction data that may be shared with the monitoring server 120. The transaction data may comprise a transaction identifier (e.g., which may include or may be associated with a transaction time stamp, a user identifier associated with the transaction, and/or the like), a source POS identifier (e.g., corresponding with the SCO POS terminal 451 dispensing the cash), a destination POS identifier (e.g., corresponding with the POS terminal 450 indicated as receiving the cash dispensed from the SCO POS terminal 451), denomination-specific cash quantities involved in the transaction, and/or the like. In various embodiments, transaction data may be generated and provided to the monitoring server 120 in real-time, thereby enabling access to the generated transaction data by a plurality of associated users (e.g., financial institution-related users, management users, and/or the like) operating corresponding user computing entities (e.g., user computing entities 110) in communication with the monitoring server 120. In certain embodiments, such real-time (or near real-time) data access may enable users to provide updated instructions for dispensing cash to be provided to other POS terminals 450 within a retail establishment, for example, in real-time, thereby enabling real-time management of cash usage and distribution within a retail establishment. In other embodiments, the monitoring server 120 may be configured to automatically manage cash usage and/or distribution within a retail establishment, for example, via one or more cash usage models generated and/or maintained for a specific retail establishment. Such cash usage models may encompass one or more user-defined parameters (e.g., indicative of a desired minimum amount of cash within any POS terminals 450, indicative of a desired maximum number of cash management transactions occurring at any SCO POS terminal 451, and/or the like).

In certain embodiments, the SCO POS terminal 451 may be operable together with a cash safe (e.g., a smart-safe) configured for receiving cash and securely storing the cash therein, for example, until the cash is removed for transport to a financial institution. Such a safe may not provide dispensing functionalities, as such dispensing functionalities may be provided by the SCO POS terminal 451, as discussed herein.

With detailed reference to the flowcharts of FIGS. 7A-7B, the monitoring server 120 stores historical cash usage data for each of a plurality of POS terminals 450, as reflected at Block 701. This historical cash usage data is utilized in generating cash usage models for each of the plurality of POS terminals 450 within a retail establishment as discussed above. The historical cash usage data may reflect historical cash usage at a POS terminal 450 for a particular time period (e.g., one day) as determined based on a plurality of time periods (e.g., to determine average usage during a day based at least in part on historical usage over a year or longer). More specific usage data may be determined in certain embodiments, as based on characteristics of a particular time period (e.g., average cash usage by a particular POS terminal 450 on May 5 each year, as determined based at least in part on a multi-year historical cash usage data set; average cash usage by a particular POS terminal 450 on days where the local professional sports team is playing a home game, as determined based at least in part on a year or more of historical cash usage data; and/or the like).

Using the historical cash usage data, the monitoring server 120 generates cash usage forecast data for each of a plurality of POS terminals 450, as indicated at Block 702. The cash usage forecast data may be generated for SCO-enabled POS terminals 451 as well as traditional, employee-operated POS terminals. The cash usage forecast data may provide a level of specificity to enable the monitoring server 120 to ultimately determine whether an amount of cash currently present within a POS terminal 450 is likely to enable continuous operation of the POS terminal 450 at least until a next change-over/delivery of cash to the POS terminal 450. Accordingly, the cash usage forecast data may be sufficiently granular as to enable a forecast of cash usage by the day, by the hour, and/or within other time-periods. The cash usage forecast data may be stored for each of a plurality of POS terminals 450. The cash usage forecast data may be updated periodically (e.g., after each day, after each week, and/or the like). While the cash usage forecast data may be utilized for real-time determinations of whether a particular POS terminal 450 has sufficient cash located therein, the cash usage forecast data itself need not be updated in real-time.

As shown at Block 703, the monitoring server 120 receives cash usage data in real-time for each of a plurality of POS terminals 450. The cash usage data may reflect the amount of cash available at a POS terminal 450 (e.g., at a denominational level). In certain embodiments, the cash usage data encompasses transaction data indicative of transactions occurring at each of the POS terminals 450 (e.g., sales transactions with customers that may increase or decrease the total amount of cash within POS terminals 450 and/or may impact the amount of each denomination of cash within a POS terminal 450). Accordingly, the cash usage data may be generated and/or provided to the monitoring server 120 immediately upon execution of a transaction at a POS terminal 450 that impacts the amount of cash physically located within the POS terminal 450. In the case of SCO POS terminals 451 (and/or other POS terminals having recycler and/or deposit functionalities), cash usage data may additionally be generated and/or provided to the monitoring server 120 in real-time upon movement of cash between recycler and deposit portions of the SCO POS terminal 451. Such cash movement impacts the amount of cash accessible and/or otherwise usable by the SCO POS terminal 451, and therefore impacts whether the SCO POS terminal 451 will have sufficient cash to satisfy forecast cash usage needs of the SCO POS terminal 451.

The monitoring server 120 utilizes the cash usage data and the cash usage forecast data for each of the plurality of POS terminals 450 at a retail establishment to determine whether real-time cash usage data is forecast to satisfy cash usage forecast data for each POS terminal 450 at the retail establishment. Block 704 of FIG. 7 indicates that such a determination may be executed by comparing real-time cash usage data against cash usage forecast data, Such comparisons may comprise comparisons between absolute quantities of cash within a POS terminal versus forecast quantities of cash within a POS terminal according to a forecast; comparisons between usage trends for a time period (e.g., a day) versus forecast usage trends over the same time period; and/or the like.

As shown at Block 705, the monitoring server 120 determines whether the cash usage data indicates that the POS terminals 450 of the retail establishment are forecast to remain adequately funded at least until the next scheduled pick-up/delivery of cash to the POS terminals 450. If the POS terminals 450 are forecast to remain adequately funded, the process loops back to Block 703, and the cash usage data of the POS terminals 450 are continually monitored. However, upon determining that at least one POS terminal 450 is subject to a forecast shortfall of cash, the monitoring server 120 determines the predicted shortfall for each POS terminal 450 that is forecast to be subject to a cash shortfall. The predicted shortfall identifies the quantity of cash (at a denominational level, such as separately identifying the shortfall of $1 bills, the shortfall of $5 bills, the shortfall of $10 bills, and/or the like) that is required to be added to the POS terminal 450 such that the POS terminal 450 is no longer forecast to be subject to a shortfall of cash.

The monitoring server 120 then examines the amount of cash (at a denominational level) available within SCO POS terminals 451 within the retail establishment to determine whether any of those SCO POS terminals 451 satisfy reallocation source criteria such that the SCO POS terminals 451 are capable of providing the determined shortfall to the POS terminal that is subject to the forecast cash shortfall, as indicated at Block 707. As a part of determining whether any of the SCO POS terminals 451 satisfy reallocation source criteria, the monitoring server 120 determines whether the predicted shortfall can be removed from any of the SCO POS terminals 451 while maintaining adequate funding such that the SCO POS terminal 451 is not itself subject to a cash shortfall. For example, the monitoring server 120 may calculate whether the current amount of available cash within an SCO POS terminal 451 minus the amount of the predicted shortfall calculated in accordance with Block 706 (for each denomination) would be forecast to satisfy cash usage forecast data generated for the SCO POS terminal 451. This calculation is performed for all available SCO POS terminals 451, such that the monitoring server 120 determines whether any of the available SCO POS terminals 451 are eligible to provide cash to a POS terminal 450 to alleviate a forecast cash deficiency of the POS terminal 450.

As indicated at Block 708, if none of the SCO POS terminals 451 satisfy reallocation source criteria and have sufficient available cash to alleviate the forecast cash shortfall of the POS terminal 450, the monitoring server 120 initiates a replenishment of cash to the POS terminal 450 subject to the forecast cash shortfall from the cash handling device 400, such as by scheduling an otherwise unscheduled delivery of cash from the cash handling device 400 to the POS terminal 450. In certain embodiments, initiating a delivery of cash from the cash handling device 400 encompasses transmitting instructions to the cash handling device 400 specifying the amount of cash (at a denominational level) to be dispensed for delivery to the particular POS terminal subject to a forecast cash shortfall. The instructions provided to the cash handling device 400 may be executable only upon the occurrence of a trigger event at the cash handling device 400, such as receipt of user input from an authorized user requesting withdrawal of cash to replenish the POS terminal 450 subject to the forecast cash shortfall. To further ensure the cash is delivered to the POS terminal 450 subject to the forecast cash shortfall prior to the POS terminal 450 actually running out of at least one denomination of cash, the monitoring server 120 may additionally generate and transmit a notification to a user computing entity 110 associated with an authorized user requesting the authorized user to complete the delivery of cash from the cash handling device 400 to the POS terminal 450. Ultimately, once the POS terminal 450 has been replenished, the process continues to iterate, beginning at Block 703, as usage of POS terminals are monitored in real-time.

However, if an SCO POS terminal 451 is identified as having sufficient available cash (in the correct denominations, such as the correct number of $1 bills, the correct number of $5 bills, the correct number of $10 bills, and/or the like) to alleviate the forecast cash shortfall of the POS terminal 450, the monitoring server 120 begins generation of reallocation data including reallocation instructions defining a denomination-specific cash quantity for reallocation. The reallocation instructions, when executed, cause the SCO POS terminal 451 to dispense an amount of cash (in the denominations defined according to the denomination-specific cash quantity, such as dispensing a defined amount of each denomination of cash) to satisfy the predicted shortfall, such that the dispensed cash can be delivered to and added to the POS terminal that is subject to the predicted shortfall. As indicated at Block 709, this process begins by identifying the SCO POS terminal 451 to be utilized to dispense cash to alleviate the predicted cash shortage of the POS terminal (the identified SCO POS terminal subsequently being denoted as the "first" SCO POS terminal 451 and the POS terminal that is subject to the deficiency being subsequently denoted as the "second" POS terminal 450 to ease distinction between these devices in the following discussion).

The reallocation data is then generated specifically for the identified first SCO POS terminal 451, as indicated at Block 710. The reallocation data comprises reallocation instructions to be transmitted to the first SCO POS terminal 451. The reallocation instructions identify denomination-specific cash quantities, which indicate the amount of cash, by denomination, to be dispensed from the first SCO POS terminal 451. The reallocation instructions may additionally comprise other contextual data regarding the transfer (such contextual data may be displayed on a screen of the first SCO POS terminal 451 during dispensing of cash, for example), such as a destination POS terminal (the second POS terminal 450), a deadline for executing the transfer of funds from the first SCO POS terminal 451 to the second POS terminal 450, and/or the like. The reallocation instructions may additionally identify one or more authorized users to complete the transfer of funds, although in other embodiments the monitoring server 120 and/or the first SCO POS terminal may identify a default listing of authorized users, any of whom are authorized to complete a funds transfer from the first SCO POS terminal to a second POS terminal.

The reallocation data of certain embodiments additionally comprises a notification to be transmitted to one or more authorized users indicative of the need for a transfer of funds between POS terminals 450 to ensure that all POS terminals 450 are not subject to a forecast shortfall. The notification identifies the first SCO POS terminal 451, the second POS terminal 450, and a deadline for completing the transfer (if applicable). In certain embodiments, the notification additionally identifies the amount of the transfer, however such data need not be included in the notification, as the reallocation instructions provided to the first SCO POS terminal 451 may cause the first SCO POS terminal 451 to automatically dispense the appropriate amount and denominations of cash for the transfer.

As indicated at Blocks 711-712, the reallocation instructions are transmitted to the first SCO POS terminal 451 and the notification is transmitted to applicable user computing entities 110 associated with authorized users. In certain embodiments, additional reallocation instructions may be transmitted to the second POS terminal 450, however the second POS terminal may be otherwise configured to automatically complete necessary steps for intaking new cash once received, examples of such steps being discussed below.

With reference to Block 713, the first SCO POS terminal 451 begins initiation of the transfer of funds by transitioning into a cash management mode of operation (from a primary mode of operation used for executing customer-facing transactions), if applicable. The cash management mode of operation enables the SCO POS terminal 451 and the monitoring server 120 to distinguish between customer-facing transactions and cash management transactions for transferring funds between POS terminals 450. Thus, when cash is dispensed as a part of a cash management transaction for transferring cash between POS terminals 450 (or from a POS terminal to the cash handling device 400), transaction data generated as a part of the transaction may be tagged with metadata as a cash management transaction, whereas customer-facing transactions (e.g., purchases, refunds, and/or the like) may be tagged with metadata as primary transactions.

The SCO POS terminal 451 may be configured to switch into the cash management mode upon the occurrence of an appropriate trigger event. For example, the SCO POS terminal 451 may be configured to enter the cash management mode upon receipt of user input from an authorized user.

Once the first SCO POS terminal 451 is in the cash management mode (or otherwise once the first SCO POS terminal 451 confirms that an authorized user is present), the first SCO POS terminal 451 executes the reallocation instructions that were provided from the monitoring server 120 to dispense cash to be reallocated to the second POS terminal. In certain embodiments, the reallocation instructions may have been stored locally on the first SCO POS terminal until executed by the first SCO POS terminal 451. In other embodiments, the first SCO POS terminal 451 may query the monitoring server 120 for the reallocation instructions upon receipt of user input requesting initiation of the reallocation instructions, such that the first SCO POS terminal 451 only receives and executes the reallocation instructions when an authorized user requests that cash is dispensed in accordance with the reallocation instructions.

By executing the reallocation instructions at the first SCO POS terminal 451, the first SCO POS terminal 451 dispenses cash in accordance with the reallocation instructions. The first SCO POS terminal 451 dispenses the determined quantity of cash needed to be transferred to the second POS terminal 450 to alleviate the forecast shortfall. The amount of cash is determined at the denominational level, such that the dispensed cash satisfies forecast cash shortfalls specific for certain denominations (e.g., a $100 shortfall may specifically be indicated as being a shortfall of 100 $1 bills, rather than a single $100 bill).

To complete execution of the reallocation instructions, the first SCO POS terminal 451 transmits reallocation confirmation data to the monitoring server 120, reflective of the removal of cash for reallocation to the second POS terminal 450, as reflected at Block 715. The reallocation confirmation data may be embodied as a type of transaction data, and may identify the amount of cash removed (at a denominational level), the user executing the removal of cash (e.g., a user identifier of the authorized user), a time/date of the removal of cash, the intended destination of the removed cash, and/or the like. Moreover, as mentioned, the reallocation confirmation data may comprise metadata tagging the transaction as a cash management transaction. Thereafter, the first SCO POS terminal 451 may reenter the primary mode of operation to be accessible to customers.

Once the user has obtained the cash from the first SCO POS terminal 451, the user transports the cash to the second POS terminal 450 to be deposited therein. As shown at Block 716 and if applicable, the second POS terminal 450 enters a cash management mode of operation (it should be understood that the second POS terminal 450 may be an SCO POS terminal 451 or an employee operated POS terminal) for receipt of the cash reallocated from the first SCO POS terminal 451. Like the first SCO POS terminal 451, the second POS terminal 450 may enter the cash management mode of operation upon the occurrence of an appropriate trigger event, such as receipt of user input at the second POS terminal 450.

As indicated at Block 717, the second POS terminal 450 receives the cash within a register till thereof. The user may place the cash within a register till drawer (of a traditional employee-operated POS terminal 450), or the user may feed the cash into a cash receipt slot (e.g., of an SCO POS terminal 451, which may then read and sort each item of cash received). Upon receipt of the cash at the second POS terminal 450, the second POS terminal 450 transmits receipt confirmation data (e.g., a type of cash management transaction data) indicative of the amount of cash received (at a denominational level), the time/date when the cash was received, the user associated with the deposit of cash to the second POS terminal 450, and/or the like. The receipt confirmation data may be transmitted to the monitoring server 120, which reconciles the receipt confirmation data with the reallocation confirmation data to ensure the cash was appropriately allocated from the first SCO POS terminal 451 to the second POS terminal 450, as indicated at Block 719. Moreover, the receipt confirmation data and/or the reallocation confirmation data may be further reconciled against the reallocation data to ensure that the intended amount of cash (at a denominational level) was reallocated from the first SCO POS terminal 451 to the second POS terminal 450.

Each of the first SCO POS terminal 451 (as mentioned above) and the second POS terminal 450 return to the primary operating mode as indicated at Block 720, so as to enable the POS terminals to continue executing customer-facing transactions. After the cash has been deposited in the second POS terminal 450, the monitoring server 120 continues monitoring cash usage from all POS terminals within the retail establishment to ensure that no additional POS terminals are subject to a forecast deficit.

Although discussed above in reference to a single POS terminal 450 being funded by a single SCO POS terminal 451, it should be understood that any number of POS terminals 450 may be involved in a reallocation transaction. For example, a single POS terminal 450 that is subject to a forecast deficiency may be funded by a plurality of SCO POS terminals 451 (each SCO POS terminal contributing a portion of the cash necessary to alleviate the forecast deficiency, the respective amount contributed by each SCO POS terminal 451 being determined based at least in part on a determined quantity of cash that may be contributed by the SCO POS terminal without subjecting the SCO POS terminal to a forecast deficiency). As another example, multiple POS terminals 450 may be subject to a forecast deficiency that may be alleviated by cash reallocated from one or more SCO POS terminals 451.

In certain embodiments, the monitoring server 120 may be configured to generate reallocation data in accordance with a defined schedule of times available for use in reallocating cash. In order to ensure that authorized users are not required to constantly move cash between POS terminals (for example, if a second forecast deficiency is identified shortly after a first forecast deficiency is alleviated), the monitoring server 120 may be configured to allow detected forecast deficiencies to accumulate until a scheduled time, at which point the monitoring server 120 determines whether the SCO POS terminals 451 of the retail establishment are capable of alleviating all of the detected forecast deficiencies. In certain embodiments, a limited number of times available for generating reallocation data may be available during a particular time period (e.g., one time during a particular shift, two times during a shift, and/or the like).

In yet other embodiments, the monitoring server 120 may be configured to reallocate cash in certain circumstances that do not result in completely alleviating a detected forecast deficiency. For example, upon determining that no SCO POS terminals 451 are capable of supplying cash to entirely alleviate a forecast deficiency of a POS terminal 450, the monitoring server 120 may generate reallocation data to transfer cash from one or more SCO POS terminals 451 to the POS terminal 450 subject to a forecast deficiency in order to delay the forecast timing of the deficiency. In accordance with such circumstances, by reallocating cash to at least partially alleviate the forecast deficiency, the monitoring server 120 can perform a similar check to see if any SCO POS terminals 451 are capable of completely alleviating the detected deficiency at a later time. Alternatively, a partial alleviation of a forecast deficiency may be sufficient to adequately fund a POS terminal 450, for example, if the POS terminal 450 is subject to an atypically small cash demand after the reallocation has been completed. Accordingly, a partial alleviation of a forecast deficiency may enable the monitoring server 120 to later fully alleviate the deficiency, after additional usage data has been generated for each of the plurality of POS terminals within a retail establishment.

As mentioned, FIG. 5 provides a specific illustration of steps associated with reallocating funds between two SCO POS terminals 451. As shown therein, each of the SCO POS terminals 451 operate in a primary operating mode for transactions with customers, as reflected at Blocks 501-502. Cash usage data indicative of the operation each of the SCO POS terminals 451 is provided to the back office server (represented at Block 503). As discussed herein, such data may be embodied as transaction data (indicative of transactions occurring at each of the SCO POS terminals 451), and/or other data which provides data indicative of the amount of cash in each SCO POS terminal 451. The back office server relays the cash usage data to the monitoring server 120, which ingests the cash usage data as reflected at Block 504. The monitoring server 120 aggregates the cash usage data (as well as historical data that may be stored in a memory storage area accessible to the monitoring server 120) and generates forecast cash usage for each of the SCO POS terminals 451, as reflected at Block 505. As indicated at Block 506, the monitoring server 120 determines whether the forecast cash usage data indicates that the SCO POS terminals 451, including their current levels of available cash and forecast cash usage, indicates that the SCO POS terminals 451 are forecast to remain adequately funded. If the SCO POS terminals 451 are all projected to remain adequately funded, the monitoring server 120 continues ingesting newly received cash usage data to enable constant monitoring of cash levels within the SCO POS terminals 451. However, if one of the SCO POS terminals 451 (SCO Y in the illustrated example) is subject to a forecast shortfall, the monitoring server 120 determines whether there is sufficient cash in another SCO POS terminal 451 (e.g., SCO X) that can be reallocated to alleviate the forecast shortfall within SCO Y, as indicated at Block 507. If no other SCO POS terminals 451 are capable of providing funds to alleviate the forecast shortfall, the monitoring server 120 provides instructions to the cash handling device 400 to provide cash to alleviate the forecast shortfall, and the cash handling device 400 provides a display indicating that funds are ready for dispensing for providing to the SCO with the projected shortfall (SCO Y), as indicated at Block 509. Thereafter, the cash handling device 400 dispenses the cash upon the occurrence of an appropriate trigger event (e.g., receipt of appropriate user input from an authorized user). The cash is then provided to SCO Y, which accepts the funds from the cash handling device 400.

However, if another SCO POS terminal 451 (e.g., SCO X) is determined to have sufficient cash available to alleviate the forecast shortfall of SCO Y, the monitoring server 120 provides a notification to an authorized user to remove the funds (an identified amount of each of one or more identified denominations of cash) from SCO X for provision to SCO Y. This notification is provided to the user, as indicated at Block 508. In certain embodiments, the monitoring server 120 additionally provides reallocation instructions to SCO X, which cause SCO X to dispense the funds (the identified amount of each of the identified denominations) for reallocation to SCO Y. However, it should be understood that in certain embodiments, the SCO POS terminal 451 may be configured to receive user input from an authorized user selecting the amount and denominations of funds to be dispensed for reallocation to the SCO POS terminal 451 subject to the forecast shortfall.

As indicated at Block 510, the funds subject to reallocation are removed from SCO X, and as indicated at Block 511, the funds are accepted at SCO Y. Each of the SCO POS terminals 451 may provide data indicative of a confirmation of the reallocation of funds to the monitoring server 120 as discussed above, thereby enabling the monitoring server 120 to reconcile the transaction. Moreover, as discussed above, the reallocation transaction may occur while each of the SCO POS terminals 451 are in a cash management mode of operation, in which customer-facing transactions are unavailable and all transactions are flagged (e.g., with metadata associated with generated transaction data) as cash management transactions for distinction at the monitoring server 120. Moreover, FIG. 5 further indicates that the user (e.g., an authorized user, such as an employee of a retail establishment) provides user input as needed to various physical devices to provide necessary triggering events for methods as discussed herein (Block 520).

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for tracking physical cash by a plurality of point-of-sale (POS) terminals at a retail establishment using a monitoring server in communication with the plurality of POS terminals, the method comprising:

ingesting, by one or more processors in communication with a memory, cash usage data for a self-checkout (SCO) POS terminal, wherein the cash usage data indicates cash usage of the SCO POS terminal during a primary mode for accepting cash and dispensing cash during customer-facing transactions and indicates an amount of cash in the SCO POS terminal at a denominational level, wherein the SCO POS terminal is configurable between the primary mode and a cash management mode for executing reallocation instructions generated by the monitoring server to dispense physical cash from the SCO POS terminal;

ingesting, by the one or more processors, cash usage data for a second POS terminal executing customer-facing transactions while operating in the primary mode;

computing cash usage forecast data for the second POS terminal;

upon determining that the cash usage data of the second POS terminal does not satisfy the cash usage forecast data for a first denomination of cash at the second POS terminal:

automatically dispensing, by the SCO POS terminal, a specific quantity of the first denomination of cash while the SCO POS terminal is in the cash management mode;

informing, by the one or more processors, a user computing entity regarding the first denomination of cash for dispensing from the SCO POS terminal and placement in the second POS terminal; and electronically monitoring, by the one or more processors, movement of the first denomination of cash from the SCO POS terminal to the second POS terminal and determining an updated amount of the first denomination of cash in each of the SCO POS terminal and the second POS terminal.

2. The method of claim 1, wherein the second POS terminal is a second SCO POS terminal, and wherein the method further comprises:

upon determining that the cash usage of the second SCO POS terminal does not satisfy cash usage forecast data stored for the second SCO POS terminal, identifying the SCO POS terminal as satisfying reallocation source criteria for providing the specific quantity of the first denomination of cash to be transferred to the second SCO POS terminal.

3. The method of claim 2, wherein identifying the SCO POS terminal as satisfying reallocation source criteria comprises:

comparing cash usage of each of a plurality of SCO POS terminals with stored cash usage forecast data for each of the plurality of SCO POS terminals; and determining whether removal of the specific quantity of the first denomination of cash from the SCO POS terminal would cause the cash usage of the SCO POS terminal to fail to satisfy the cash usage forecast data.

4. The method of claim 1, further comprising:

upon determining that the cash usage of the second POS terminal does not satisfy cash usage forecast data stored for the second POS terminal, determining the specific quantity of the first denomination of cash based at least in part on a comparison between the cash usage for the second POS terminal and the cash usage forecast data for the second POS terminal.

5. The method of claim 1, wherein the second POS terminal is a second SCO POS terminal, and wherein monitoring cash usage from the second SCO POS terminal comprises receiving cash usage data from the second SCO POS terminal.

6. The method of claim 1, further comprising:

receiving reallocation confirmation data from at least one of the SCO POS terminal or the second POS terminal, wherein the reallocation confirmation data identifies the amount of cash transferred from the SCO POS terminal to the second POS terminal; and reconciling the reallocation confirmation data with the reallocation instructions.

7. A system for physical cash by a plurality of point-of-sale (POS) terminals at a retail establishment, the system comprising:

a self-checkout (SCO) POS terminal configured to generate cash usage data in real-time, wherein the cash usage data indicates cash usage of the SCO POS terminal during a primary mode for accepting cash and dispensing cash during customer-facing transactions and indicates an amount of cash in the SCO POS terminal at a denominational level, wherein the SCO POS terminal is configurable between the primary mode and a cash management mode for executing reallocation instructions to dispense physical cash from the SCO POS terminal;

one or more memory storage areas; and one or more processors in communication with the plurality of POS terminals, the one or more processors configured to:

receive the cash usage data;

receive cash usage data for a second POS terminal executing customer-facing transactions while operating in the primary mode;

compute cash usage forecast data for the second POS terminal;

upon determining that the cash usage data of the second POS terminal does not satisfy the cash usage forecast data for a first denomination of cash at the second POS terminal:

inform a user computing entity regarding the first denomination of cash for dispensing from the SCO POS terminal and placement in the second POS terminal; and wherein the SCO POS terminal is configured to, after receipt of the reallocation instructions, automatically dispense a specific quantity of the first denomination of cash while the SCO POS terminal is in the cash management mode; and after the SCO POS terminal automatically dispenses the specific quantity of the first denomination of cash, the one or more processors are configured to electronically monitor movement of the first denomination of cash from the first SCO POS terminal to the second POS terminal and determine an updated amount of the first denomination of cash in each of the SCO POS terminal and the second POS terminal.

8. The system of claim 7, wherein the second POS terminal is a second SCO POS terminal and wherein the one or more processors are further configured to:

upon determining that the cash usage of the second POS terminal does not satisfy cash usage forecast data stored for the second POS terminal, identify the SCO POS terminal as satisfying reallocation source criteria for providing the specific quantity of the first denomination of cash to be transferred to the second SCO POS terminal.

9. The system of claim 8, wherein identifying the SCO POS terminal as satisfying reallocation source criteria comprises:

comparing cash usage of each of a plurality of SCO POS terminals with stored cash usage forecast data for each of the plurality of SCO POS terminals; and determining whether removal of the specific quantity of the first denomination of cash from the SCO POS terminal would cause the cash usage of the SCO POS terminal to fail to satisfy the cash usage forecast data.

10. The system of claim 7, wherein the one or more processors are further configured to:

upon determining that the cash usage of the second POS terminal does not satisfy cash usage forecast data stored for the second POS terminal, determine the specific quantity of the first denomination of cash based at least in part on a comparison between the cash usage for the second POS terminal and the cash usage forecast data for the second POS terminal.

11. The system of claim 7, wherein the second POS terminal is a second SCO POS terminal, and wherein monitoring cash usage from the second SCO POS terminal comprises receiving cash usage data from the second SCO POS terminal.

12. The system of claim 7, wherein the one or more processors are further configured to:

receive reallocation confirmation data from at least one of the SCO POS terminal or the second POS terminal, wherein the reallocation confirmation data identifies the amount of cash transferred from the SCO POS terminal to the second POS terminal; and reconcile the reallocation confirmation data with the reallocation instructions.

13. A computer program product comprising a non-transitory computer readable medium having computer program instructions stored therein, the computer program instructions when executed by a processor, cause the processor to:

ingest cash usage data for a self-checkout (SCO) POS terminal, wherein the cash usage data indicates cash usage of the SCO POS terminal during a primary mode for accepting cash and dispensing cash during customer-facing transactions and indicates an amount of cash in the SCO POS terminal at a denominational level, wherein the SCO POS terminal is configurable between the primary mode and a cash management mode for executing reallocation instructions to dispense physical cash from the SCO POS terminal;

ingest cash usage data for a second POS terminal executing customer-facing transactions while operating in the primary mode;

compute cash usage forecast data for the second POS terminal;

upon determining that the cash usage data of the second POS terminal does not satisfy the cash usage forecast data for a first denomination of cash at the second POS terminal:

automatically dispense, by the SCO POS terminal, a specific quantity of the first denomination of cash while the SCO POS terminal is in the cash management mode;

inform a user computing entity regarding the first denomination of cash for dispensing from the SCO POS terminal and placement in the second POS terminal; and electronically monitor movement of the first denomination of cash from the first SCO POS terminal to the second POS terminal and determine an updated amount of the first denomination of cash in each of the SCO POS terminal and the second POS terminal.

14. The computer program product of claim 13, wherein the second POS terminal is a second SCO POS terminal and wherein the computer program instructions are further configured to cause the processor to:

upon determining that the cash usage of the second POS terminal does not satisfy cash usage forecast data stored for the second POS terminal, identify the SCO POS terminal as satisfying reallocation source criteria for providing the specific quantity of the first denomination of cash to be transferred to the second SCO POS terminal.

15. The computer program product of claim 14, wherein identifying the SCO POS terminal as satisfying reallocation source criteria comprises:

comparing cash usage of each of a plurality of SCO POS terminals with stored cash usage forecast data for each of the plurality of SCO POS terminals; and determining whether removal of the specific quantity of the first denomination of cash from the SCO POS terminal would cause the cash usage of the SCO POS terminal to fail to satisfy the cash usage forecast data.

16. The computer program product of claim 13, wherein the computer program instructions are further configured to cause the processor to:

upon determining that the cash usage of the second POS terminal does not satisfy cash usage forecast data stored for the second POS terminal, determine the specific quantity of the first denomination of cash based at least in part on a comparison between the cash usage for the second POS terminal and the cash usage forecast data for the second POS terminal.

17. The computer program product of claim 13, wherein the second POS terminal is a second SCO POS terminal, and wherein monitoring cash usage from the second SCO POS terminal comprises receiving cash usage data from the second SCO POS terminal.

18. The computer program product of claim 13, wherein the computer program instructions are further configured to cause the processor to:

receive reallocation confirmation data from at least one of the SCO POS terminal or the second POS terminal, wherein the reallocation confirmation data identifies the amount of cash transferred from the SCO POS terminal to the second POS terminal; and reconcile the reallocation confirmation data with the reallocation instructions.

19. A method for automatically reallocating physical cash among a plurality of point-of-sale (POS) terminals, the method comprising:

operating a first self-checkout (SCO) POS terminal in a primary mode for executing customer-facing transactions;

receiving, at the first SCO POS terminal, reallocation instructions from a monitoring server, wherein the reallocation instructions identify a second POS terminal for receiving a cash transfer from the first SCO POS terminal and identifying a denomination-specific cash quantity to be transferred to the second POS terminal;

in response to receipt of user input, changing operation of the first SCO POS terminal from the primary mode to a cash management mode for executing reallocation transactions with others of the plurality of POS terminals;

while operating in the cash management mode, executing the reallocation instructions via the first SCO POS terminal to dispense the denomination-specific cash quantity from the first SCO POS terminal;

update data of an amount of cash available within the first SCO POS terminal to reflect the denomination-specific cash quantity dispensed from the first SCO POS terminal; and transfer, from the first SCO POS terminal, reallocation confirmation data to the monitoring server, wherein the monitoring server is configured to reconcile the reallocation confirmation data against secondary reallocation confirmation data received from the second POS terminal after the second POS terminal receives the denomination-specific cash quantity dispensed from the first SCO POS terminal.

* * * * *